United States Patent [19]
Phillips et al.

[11] Patent Number: 5,471,628
[45] Date of Patent: Nov. 28, 1995

[54] MULTI-FUNCTION PERMUTATION SWITCH FOR ROTATING AND MANIPULATING AN ORDER OF BITS OF AN INPUT DATA BYTE IN EITHER CYCLIC OR NON-CYCLIC MODE

[75] Inventors: James E. Phillips, Binghamton; Bartholomew Blaner, Newark Valley; Stamatis Vassiliadis, Vestal, all of N.Y.

[73] Assignee: International Business Machines Corporation, Armonk, N.Y.

[21] Appl. No.: 906,729

[22] Filed: Jun. 30, 1992

[51] Int. Cl.⁶ .................................... G06F 9/315
[52] U.S. Cl. .............. 395/800; 395/775; 364/DIG. 1; 364/259.5; 364/259.8; 364/262.9
[58] Field of Search .................... 395/800, 375, 395/775; 364/715.08, 716, 736; 340/825.75

[56] References Cited

U.S. PATENT DOCUMENTS

| | | | |
|---|---|---|---|
| 3,916,388 | 10/1975 | Shimp et al. | 395/425 |
| 4,135,242 | 1/1979 | Ward et al. | 395/775 |
| 4,141,005 | 2/1979 | Bonner et al. | 341/60 |
| 4,189,772 | 2/1980 | Liptay | 395/375 |
| 4,408,275 | 10/1983 | Kubo et al. | 395/400 |
| 4,490,809 | 12/1984 | Ueda et al. | 377/73 |
| 4,569,016 | 2/1986 | Hao et al. | 395/375 |
| 4,580,214 | 4/1986 | Kubo et al. | 395/425 |
| 4,598,365 | 7/1986 | Boothroyd et al. | 395/375 |
| 4,638,429 | 1/1987 | Watabe et al. | 395/375 |
| 4,654,781 | 3/1987 | Schwartz et al. | 395/425 |
| 4,785,393 | 11/1988 | Chu et al. | 395/375 |
| 4,814,976 | 3/1989 | Hansen et al. | 395/375 |
| 4,864,527 | 9/1989 | Peng et al. | 364/748 |
| 4,916,606 | 4/1990 | Yamaoka et al. | 395/375 |
| 4,920,483 | 4/1990 | Pogue et al. | 395/425 |
| 4,931,925 | 6/1990 | Utsumi et al. | 395/775 |
| 4,959,779 | 9/1990 | Weber et al. | 395/775 |
| 5,113,515 | 5/1993 | Fite et al. | 395/425 |
| 5,222,225 | 6/1993 | Groves | 395/425 |
| 5,287,532 | 2/1994 | Hunt | 395/800 |

FOREIGN PATENT DOCUMENTS 55-72267  5/1980  Japan.

OTHER PUBLICATIONS

Goldberg et al.; "Right/Left Shifter Using booth's Algorithm", IBM TDB vol. 30, No. 12 May 1988, pp. 291–297.
Angiulli et al; "High Performance two–cycle loop decimal multiply Algorithm", IBM TDB vol. 24, N-4 Sep. 1981, pp. 1845–1849.
Schaughenay, "Partial Parity Predict for CPU having architectural Rotate and mark/merge unit"; IBM TDB vol. 23, No. 9, Feb. 1981.
Liptay et al., "Mark controlled Byte Handling" IBM TDB vol. 20 No. 9, Feb. 1978, pp. 3598–3601.
Holtz et al; "Mark bit Generator"; IBM TDB vol. 20 No. 9 Feb. 1978, pp. 3603–3605.
Finney et al; "Using a Common Barrel Shifter for operand normalization, operand alignment and operand unpack & pack in floating point", IBM TDB vol. 29 No. 2 Jul. 1986.
Farrell et al; "Dynamic Boundary Algorithm For a data Movement Mechanism"; IBM TDB vol. 27, No. 1A Jun. 1984.

*Primary Examiner*—Krisna Lim
*Attorney, Agent, or Firm*—Lynn L. Augspurger; Laurence J. Marhoefer

[57] ABSTRACT

In a digital computer system both rotation of bits in a data byte and rotation in combination with additional manipulation, a multifunction permutation switch, in a cyclic mode of operation, connects the input bit lines to the output bit lines so that the sequence of input bits are maintained on the output bit lines when the bits on the input lines are considered as arranged in a circle, and in a non-cyclic mode of operation, connects the input bit lines to the output bit lines in a manner to execute gather operations and spread operations.

11 Claims, 23 Drawing Sheets

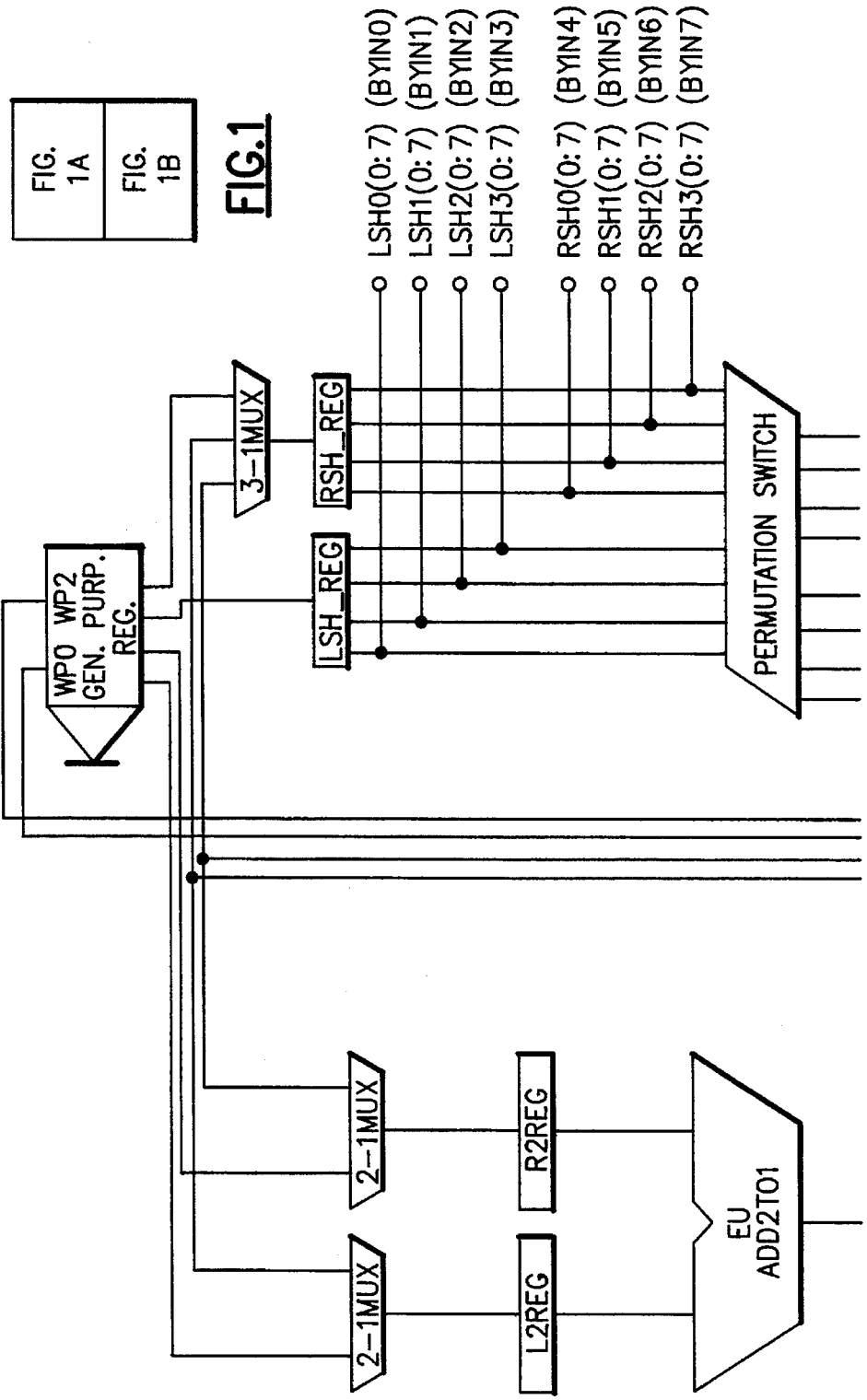

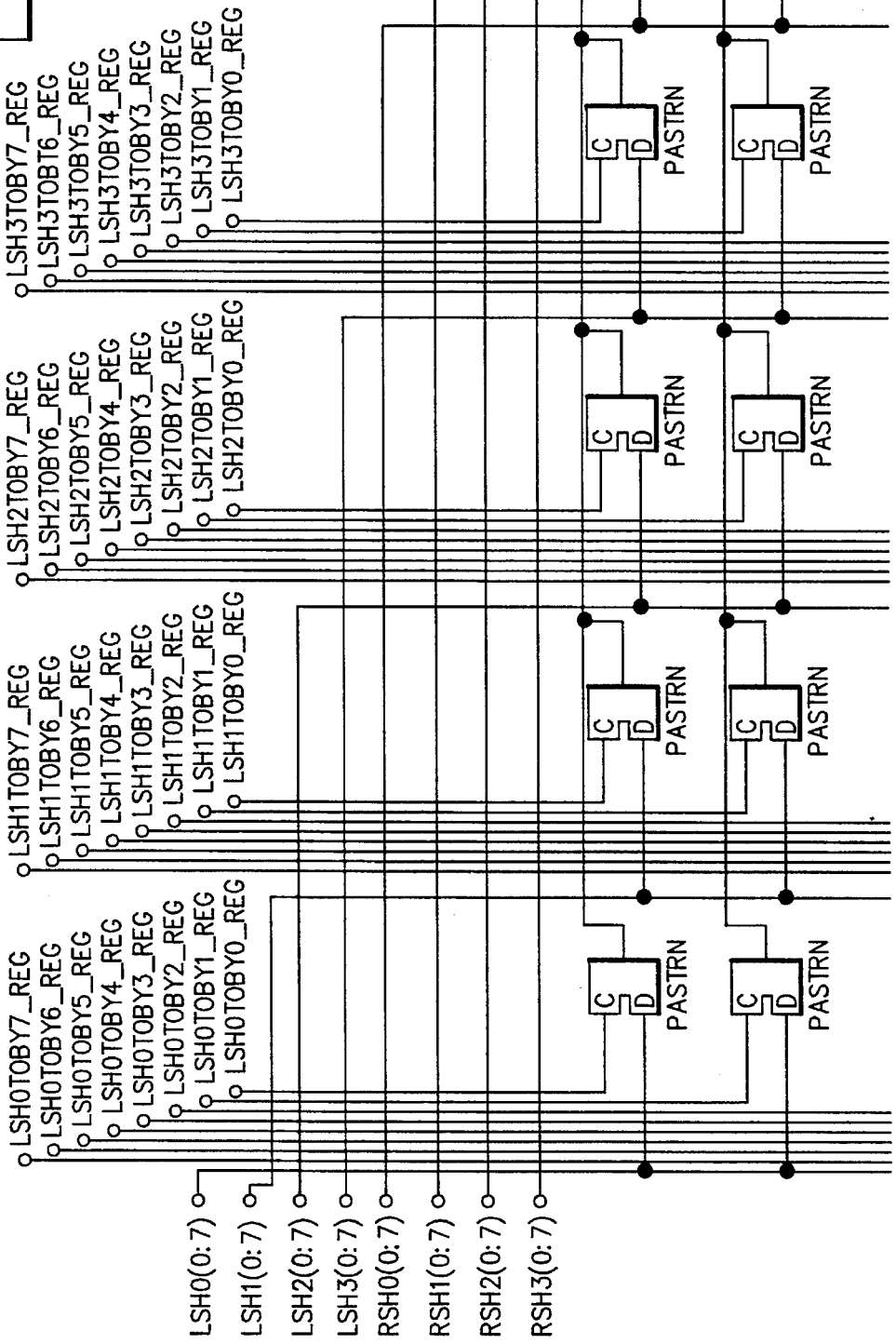

MULTI-FUNCTION PERMUTATION SWITCH FOR ROTATING AND MANIPULATING AN ORDER OF BITS OF AN INPUT DATA BYTE IN EITHER CYCLIC OR NON-CYCLIC MODE

RELATED APPLICATIONS

This application is directed to a multifunction permutation switch that can be employed in SCISM Processors and other processors which employ an existing instruction set common to International Business Machines Corporations ESA/370 instruction architecture. While the invention may be employed in other machines, examples of SCISM processors and features of SCISM processors are found in the following co-pending patent applications.

CO-PENDING PATENT APPLICATION (1) Application Ser. No. 08/186,221, filed Jan. 25, 1994, entitled "SYSTEM AND METHOD FOR OBTAINING PARALLEL EXISTING INSTRUCTIONS IN A PARTICULAR DATA PROCESSING CONFIGURATION BY COMPOUNDING INSTRUCTIONS", the inventors being Stamatis Vassiliadis et al., which is a continuation of Ser. No. 08/013,982, filed Feb. 5, 1993, now abandoned, which is a continuation of Ser. No. 07/519,384, filed May 4, 1990, now abandoned;

(2) Application Ser. No. 08/184,891, filed Jan. 21 1994, entitled "GENERAL PURPOSE COMPOUND APPARATUS FOR INSTRUCTION-LEVEL PARALLEL PROCESSORS" the inventors being Richard J. Eickemeyer et al., which is a continuation of Ser. No. 8/015,272, filed Feb. 5, 1993, now abandoned, which is a continuation of Ser. No. 07/519,382, filed May 4, 1990, now abandoned;

(3) Application Ser. No. 07/504,910, filed Apr. 4, 1990, entitled "DATA DEPENDENCY COLLAPSING HARDWARE APPARATUS" the inventors being Stamatis Vassiliadis et al., now U.S. Pat. No. 5,051,940, issued Sept. 24, 1991;

(4) Application Ser. No. 08/186,225, filed Jan. 24, 1994, entitled "COMPOUNDING PREPROCESSOR FOR CACHE" the inventors being Bartholomew Blaner et al., which is a continuation of Ser. No. 08/001,479, filed Jan. 7, 1993, now abandoned, which is a continuation of Ser. No. 07/522,219, filed May 10, 1990, now abandoned;

(5) Application Ser. No. 08/098,240, filed Jul. 29, 1993, entitled "IN-MEMORY PREPROCESSOR FOR COMPOUNDING A SEQUENCE OF INSTRUCTIONS FOR PARALLEL COMPUTER SYSTEM EXECUTION", the inventors being Richard J. Eickemeyer et al., which is a continuation of Ser. No. 07/543,464, filed Jun. 16, 1990, now abandoned. Application Ser. No. 08/098,240 is now U.S. Pat. No. 5,355,460, issued Oct. 11, 1994;

(6) Application Ser. No. 07/543,458, filed Jun. 26, 1990, entitle "MEMORY MANAGEMENT FOR SCALABLE COMPOUND INSTRUCTION SET MACHINES WITH IN-MEMORY COMPOUNDING" the inventors being Richard J. Eickemeyer et al., now U.S. Pat. No. 5,197,135, issued Mar. 23, 1994;

(7) Application Ser. No. 07/619,868, filed Nov. 28, 1990, entitle "OVERFLOW DETERMINATION FOR THREE-OPERAND ALUS IN A SCALABLE COMPOUND INSTRUCTION SET MACHINE WHICH COMPOUNDS TWO ARITHMETIC INSTRUCTIONS", the inventors being Stamatis Vassiliadis et al., now U.S. Pat. No. 5,301,341, issued Apr. 5, 1994;

(8) Application Ser. No. 07/642,011, filed Jan. 15, 1991, entitled "COMPOUNDING PREPROCESSOR FOR CACHE FOR IDENTIFYING MULTIPLE INSTRUCTIONS WHICH MAY BE EXECUTED IN PARALLEL", the inventors being Bartholomew Blaner et al., now U.S. Pat. No. 5,295,249, issued Mar. 15, 1994;

(9) Application Ser. No. 08/186,218, filed Jan. 25, 1994, entitled "SYSTEM FOR COMPOUNDING INSTRUCTIONS IN A BYTE STREAM PRIOR TO FETCHING AND IDENTIFYING THE INSTRUCTIONS FOR EXECUTION" the inventors being Richard J Eickemeyer et al, which is a continuation of Ser. No. 07/677,685, filed Mar. 29, 1991, now abandoned.

(10) Application Ser. No. 07/677,685, filed Mar. 29, 1991, entitled "SYSTEM FOR ISSUING INSTRUCTIONS FOR PARALLEL EXECUTION SUBSEQUENT TO BRANCH INTO A GROUP OF MEMBER INSTRUCTIONS WITH COMPOUDABILITY INDICATION TAG" the inventors being Stamatis Vassiliadis et al., now U.S. Pat. No. 5,303,356, issued Apr. 12, 1994; and

(11) Application Ser. No. 07/677,079, filed Mar. 29, 1991, entitled "HIGH PERFORMANCE INTERLOCK COLLAPSING SCISM ALU APPARATUS" the inventors being Stamatis Vassiliadis et al, now U.S. Pat. No. 5,299,319, issued Mar. 29, 1994.

These other co-pending applications are not specific to the present invention.

This application and the related applications are assigned to International Business Machines Corporation, Armonk, N.Y. The related applications are incorporated by reference.

FIELD OF THE INVENTION

This invention relates to the field of permutation switches and rotation merge units.

GLOSSARY OF TERMS

While dictionary meanings are also implied by certain terms used here, the following glossary may be useful. • ESA/370 refers to and is a mark for the International Business Machines Corporation mainframe system architecture used in the Enterprise Systems Architecture machines in use today. This architecture is the standard for mainframe architecture throughout the world, and using the existing instructions is important to enable use of the existing architecture. • ICM is shod for INSERT CHARACTER UNDER MASK, an existing ESA/370 instruction. • CLM is shod for COMPARE LOGICAL UNDER MASK, an existing ESA/370 instruction. • STCM is short for STORE CHARACTER UNDER MASK, an existing ESA/370 instruction. • CISC means a complex instruction set computer common to the ESA/370 and superscalar machines. • RMU is shod for Rotation Merge Unit(s). • GPR is shod for general purpose register(s) used in an array in many machines.

BACKGROUND OF THE INVENTIONS

For background literature we will review some patents and IBM Technical Disclosure Bulletins, and so that the reader can more quickly follow our discussion and understand how our permutation switch differs. Initially, it will be understood that our invention provides a multifunction permutation switch which utilizes an existing ESA/370 CISC processor with a known predefined instruction set and as such is applicable to the Systems 370–390 in widespread use today by customers of International Business Machines Corporation. Other manufacturer's mainframes also use the IBM known predefined instruction set. In the past separate hardware was required to provide the functions we will provide when we describe our multifunction permutation switch which truly supports the "rotate/gather" and "spread" functions required by ICM, CLM and STCM. In addition, in our device, we not only incorporate the "gather" function into the RMU, but partition the RMU into a byte permutation switch and a bit shifter so that data can be aligned and gathered and sent to the data cache in the same cycle.

Turning now to the patents in this ad, we note that U.S. Pat. No. 4,569,016 to Hao et al illustrates a rotation/merge unit for a RISC processor in which the developers were free to architect instructions specifically for the rotate/merge unit. This is unlike our multifunction permutation switch which utilizes an existing ESA/370 CISC processor with a known predefined instruction set. Hao et al's RMU possessed no concept of partitioning the RMU into a bytewise permutation switch followed by a bitwise shift. As a result their store alignment requires rotation by the RMU, latching of the result into a staging register, followed by sending the data to the data cache. It would be desirable to send data to the data cache in the same cycle that alignment is performed, and this is not suggested by Hao et al. By dividing the RMU into a bytewise permutation switch, we are able to send data to the data cache in the same cycle that we perform the alignment. The Hao et al's RMU possesses a merge function controlled by a mask produced in parallel with the rotation. Data to be merged is contiguous and aligned by the rotator to the position into which it is to be merged. There is no concept of the "gather" or "spread" functions that are supported in our permutation switch. In addition, we not only "gather" data, but rotate the "gathered" data in accordance with aligning the data in a doubleword of storage. Hao et al can rotate data to be inserted into a data word, but cannot "rotate and gather" the data. As a result, they require only a rotator; whereas, we are disclosing a true permutation switch that supports the "rotate/gather" and "spread" functions required by ICM, CLM, and STCM. Hao et al produce a mask for controlling the insertion of rotated data into data by an insert unit. This is accomplished by decoding two indices to produce two masks that are merged into the ultimate mask for controlling an insertion unit for zeroing data for shift operations and controlling insertion of rotated data into selected data. We on the other hand use a mask to specify how data is to be "gathered" or "spread" before being inserted into a data word. Our mask is decoded, instead of generated, to produce permutation switch controls. In U.S. Pat. No. 4,569,016 Hao et al provide the shift amount either via an immediate field of the instruction or by selected bits of a GPR. There is no logic used to determine the rotation amount that is required to support alignment of storage data within a doubleword of storage. We, on the other hand, dynamically determine in hardware the rotation amount for three different positions of the storage data within the input registers provided to the permutation switch.

A Japanese abstract, JP-55-72267, appears to differ from our permutation switch. JP-55-72267 considers a device for speeding the stores for STCM. A device to handle ICM and CLM is not pad of the device. We disclose a device suitable for supporting mask operations for all of these three ESA/370 mask instructions. The device of JP-55-72267 includes a shifter and a mark generator. The shifter aligns the data for storage while the mask is used to create a write mark to be sent to storage to indicate the bytes within the data being sent to memory that are to be written. The data and the mark are sent in pairs. Thus, the device not only requires the data, but also this mark to be sent to memory. The shifter does not execute the "rotate/gather" function for the STCM instruction that our permutation switch executes. Instead, it executes only the rotate. The memory is left to perform the "gather". The device of JP-55-72267 provides no partitioning of the shifter into a byte portion and a bit portion is presented. However, it is clear that the "gather" function of the STCM instruction is not incorporated into the shifter in any fashion. We not only incorporate the "gather" function into the RMU, but partition the RMU into a byte permutation switch and a bit shifter so that data can be aligned and gathered (if required) and sent to the data cache in the identical cycle. "Spreading" of data as required by ICM and CLM is not addressed by the device of JP-55-72267.

U.S. Pat. No. 4,189,772 to Liptay relates to a device for bypassing, around a cache, multiple sublines from a cache block during a storage access. In the device, there is no concept of executing shift instructions, "rotate/gather" operations, "spread" operations or dynamically determining the rotation amount for a storage alignment within a doubleword that supports multiple positioning of operands fed to the device as are supported by our permutation switch. In fact, the functions required by the bypass unit allow a barrel shifter to be employed instead of a permutation switch. In addition, partitioning of a shifter into byte and bit units with store aligned data taken from the byte unit and fed to the cache so that alignment and storing can be achieved in one cycle are not included in U.S. Pat. No. 4,189,772.

Pogue et al in U.S. Pat. No. 4,920,483, describe a memory system for accessing (fetch or store) n contiguous bits whether or not they are aligned at a n bit boundary. As a result, they employ a barrel shifter (rotator) for aligning the bits. Their invention, however, does not support "rotate/gather", "spread" and merge operations that require our invention to use a permutation switch in the byte unit. In addition, the concept of partitioning the RMU into a byte unit and a bit unit with aligned store taken from the byte unit to allow one cycle alignment and storing is not included. Finally, their barrel shifter does not support arithmetic or logical shifts as we do.

U.S. Pat. No. 4,135,242 to Ward et al describes a method and processor scheme to rapidly and cheaply interpret multiple virtual instruction sets, i.e. sets having varying formats that target varying width operands, data paths, and functional units whose widths do not match those implemented in hardware. As pad of the architecture scheme, they disclose a bit addressable scratch pad memory followed by an aligner to align the addressed data in the scratch pad to the inputs of the functional units. This aligner uses the scratch pad address and operand length to determine the rotation amount to produce controls for the rotator. The aligner is a rotator, not a permutation switch, since it is not required to execute "gather/rotate", "spread" or merge operations that we perform. In addition, it does not support logical and arithmetic shifts. Finally, it does not possess the concept of partitioning into byte and bit units discussed earlier to speed up store alignment and storing.

Yamaoka et al in U.S. Pat. No. 4,916,606 describe a speedup mechanism for executing sequential SS instructions in which an operand of the second instruction is modified by the first instruction. In this mechanism, an aligner was used to align an operand from storage with an ALU (for executing decimal arithmetic) and an aligner was used on the output from the ALU to align the result within a storage line. The aligners do not support the "rotate/gather", "spread" or merge operations that our invention executes so it can use a barrel shifter rather than the permutation switch which we disclose. In addition, the aligner does not implement logical or arithmetic shifts as our invention does. Therefore, there is no concept of partitioning a shifter into a byte unit and a bit unit that has already been discussed.

Peng, et al in U.S. Pat. No. 4,864,527 disclose a shifter to be used in floating point execution to normalize final results and to scale numbers with differing exponents to a common exponent before executing floating point operations. This subject is totally different from our invention. There is no concept of the "gather/rotate", "spread" or merge operations that we implement; therefore, the shifter would be executed as a shifter instead of a bytewise permutation switch. Dynamic generation of a rotation amount for aligning store data within a doubleword is not considered.

U.S. Pat. No. 4,785,393 to Chu et al describes a processor that included a mask/shifter generator and a 64 bit shifter concatenated with an ALU. This invention allowed ALU execution on selected contiguous bytes within a word and merging of the results with either the source or destination operand. No concept of "gather/rotate" or "spread" operations was included; therefore, a permutation switch was not required as is used by our invention. Furthermore, there is no concept of aligning data within a double word of storage or of dynamically generating a rotation amount for this alignment based upon the least significant bits of the effective address and store operand length. Finally, the structure being presented is dubious for use in a high performance processor since it consists of a 64 bit shifter concatenated with a 32 bit ALU.

Boothroyd et al in U.S. Pat. No. 4,598,365 describe a decimal/character functional unit for use in a processor. In their invention, two "aligners" are used to pack operand formats into data upon which an ALU can work. As a result, this "aligner" is in actuality a pack unit and is functionally quite different from our invention.

International Business Machines Corporation publishes a technical disclosure bulletin of inventions known as the "TDB". There Goldberg et al in TDB 05-88 published a mechanism for using Booth encoding of the shift amount to accomplish a left or right logical shift. The masking described in the TDB is to disable at the output those positions into which a zero should be shifted in. In our invention, we using a masking technique to also zero these positions. However, the TDB considers only using the shifter to execute shift operations. There is no concept of supplying and decoding a mask from which "rotate/gather", "spread" and merge operations are executed. There is also no concept of using the shifter to align storage operands within a doubleword of storage; therefore, there is no concept of using the address and storage operand length to control the shifter (let alone supporting multiple positioning of the storage operand data being supplied to the shifter). Lastly, there is no concept of partitioning the shifter into a byte permutation switch and a bit shifter as we do to allow store alignment and storing in one cycle. In fact, the TDB article does not require a permutation switch.

Also in the IBM TDBs can be found the publication of Finney et al in TDB 07-86 which considers using a single barrel shifter for normalization, operand alignment (presumably for differing exponents) and for packing and unpacking floating point operands. They have no concept of "rotate/gather", "spread" or merging operations executing in their invention. In addition, they do not propose using the shifter for storage operand alignment with the generation of dynamic rotate amount from the address and operand length to control their shifter. Because of the above, they do not present a concept of partitioning the shifter into a byte permutation switch and bit shifter as we do as has already been discussed.

In the IBM TDBs, Brown et al TDB 08-88 also considered a shifter for support of FPU execution. It has the identical considerations and differences as just discussed.

Also in the IBM TDBs are other publications. Funk et al TDB 01-89 published a fixed point shifter modified to accelerate floating point instructions as well. We do not do this. Our FPU (floating point unit) is on a separate chip and has its own dedicated shifter. In IBM TDB 02-78 Liptay et al published a specialized shifter to support the execution of ICM and CLM when mask bits are consecutive. As such, they to not include the "rotate/gather" operation in support of the STCM instruction. They also do not execute the "spread" operation of the ICM and CLM though they do allow for some merging. They do not utilize their hardware for other executions such as shifts and alignment of storage data within a doubleword. As such, they do not partition their special shifter into a byte permutation switch and bit shifter as we do.

Farrell et al in IBM TDB 06-84 published an algorithm for determining the length of transfers that are required to reach an ultimate address boundary. As such, they are determining how to group storage access into smaller packet fetch commands. We use an address and storage length to determine a rotation amount to align store data within a doubleword boundary or multiple word boundary, and need not make a grouping determination.

Angiulli et al in IBM TDB 09-81 published a shifter for supporting shift and add functions to implement decimal multiplies. It also supports zeroing out unrequired bit positions. However, it does none of the "rotate/gather", "spread" or merge operations that we do. Neither is the shifter partitioned into byte and bit sections as ours is.

Schaughency in IBM TDB 02-81 published a partial parity prediction scheme for a rotate/merge unit. The TDB discusses how to determine which bits are lost or picked up to determine parity. The RMU is not described; only its requirements are presented. Therefore, since it publishes a partial parity predict scheme, it has nothing to do with our invention.

Holtz et al in IBM TDB 02-78 published a mechanism for marking which bytes are to be stored within a doubleword. In their TDB article, an aligner within a double word is assumed. It, however, does not support "rotate/gather", "spread", merge or arithmetic or logical shift operations that we support in one common RMU.

SUMMARY OF THE INVENTION

Besides those differences noted in the background discussion, we note that our new multifunction switch combines the functions of alignment, merge and shift in one permutation switch. In addition, unlike others, we use our permutation switch to execute "gather/rotate" and "spread" operations as required to fully support STCM, ICM and CLM.

We provide for partitioning of the shifter into a byte permutation switch followed by a bit shifter and taking the storage aligned data from the byte permutation switch so that the aligned data can be sent to cache in the same cycle that the data is aligned.

In addition, dynamic generation of the required rotation amount to align store data within a doubleword for multiple positioning of the operands to the shifter is provided. (This prevents additional micro-instructions from being required to position the data to be stored).

Our permutation switch supports all of the required multiple operations in a single common shifter thereby reducing the area cost associated with their implementation. While supporting all of the multiple operations in a common shifter thereby reducing the area cost associated with their implementation, we also maintain a single cycle operation and without increasing the cycle time.

Our multifunction permutation switch handles bytewise permutation and has an alignment section for aligning storage data within a multiple word storage boundary, and a rotator for byte rotation in support of arithmetic/logical, left/right single/double shift/rotate operations, and can perform selective gather/spread operations to support merging operations.

In our machine operands to the permutation switch are supplied from a plurality of sources, selected from one or more of general purpose registers, storage, functional units, or a combination thereof ("merging"). Further, the output of the permutation switch is supplied as data to be stored in a data cache or storage subsystem, as well as to a bit shifter functional element for performing additional bitwise shift/rotate operations or passing results from merging operations.

Further, store data supplied to the permutation switch as input operands to be aligned and stored in a data cache or storage subsystem can be supplied with the left-most byte of data supplied to the left-most byte position of the left half of the switch, or the right-most byte of data supplied to the right-most byte position of the left half of the switch, or the right-most byte of data supplied to the right-most byte position of the right half of the switch.

Our shifter function is comprised of a bytewise permutation switch followed by a bit shifter. The permutation switch is sufficiently fast that in one embodiment, store data may pass through the switch, cross a chip boundary, and be latched in one machine cycle. This single unit supports shifting, merge and alignment operations that in the past had to be performed by separate hardware for each function. Any input byte position can be switched to any output byte position concurrently, and with appropriate controls perform the desired functions (gather, spread, etc.) concurrent with the switching.

Our invention can be used in a machine organization to provide a new rotation merge unit organization in which the byte rotator is implemented as a permutation switch that can perform store data alignment for arbitrary storage organizations, merge functions for executing bytewise merge operations as required by ESA/370 instructions COMPARE LOGICAL UNDER MASK, STORE CHARACTER UNDER MASK, and INSERT CHARACTER UNDER MASK, and bytewise shifts for executing arithmetic/logical, left/right bit shifting capability, when coupled to a bit shifter. The permutation switch may be controlled by microcode allowing microcode the use of all of the function of the switch for implementation of its algorithms. The device is useful in reducing logic requirements for processing systems supporting all or a subset of the functions listed above without impacting the machine's cycle time.

DETAILED DESCRIPTION OF THE PREFERRED EMBODIMENTS

Introduction

Figure 1B:
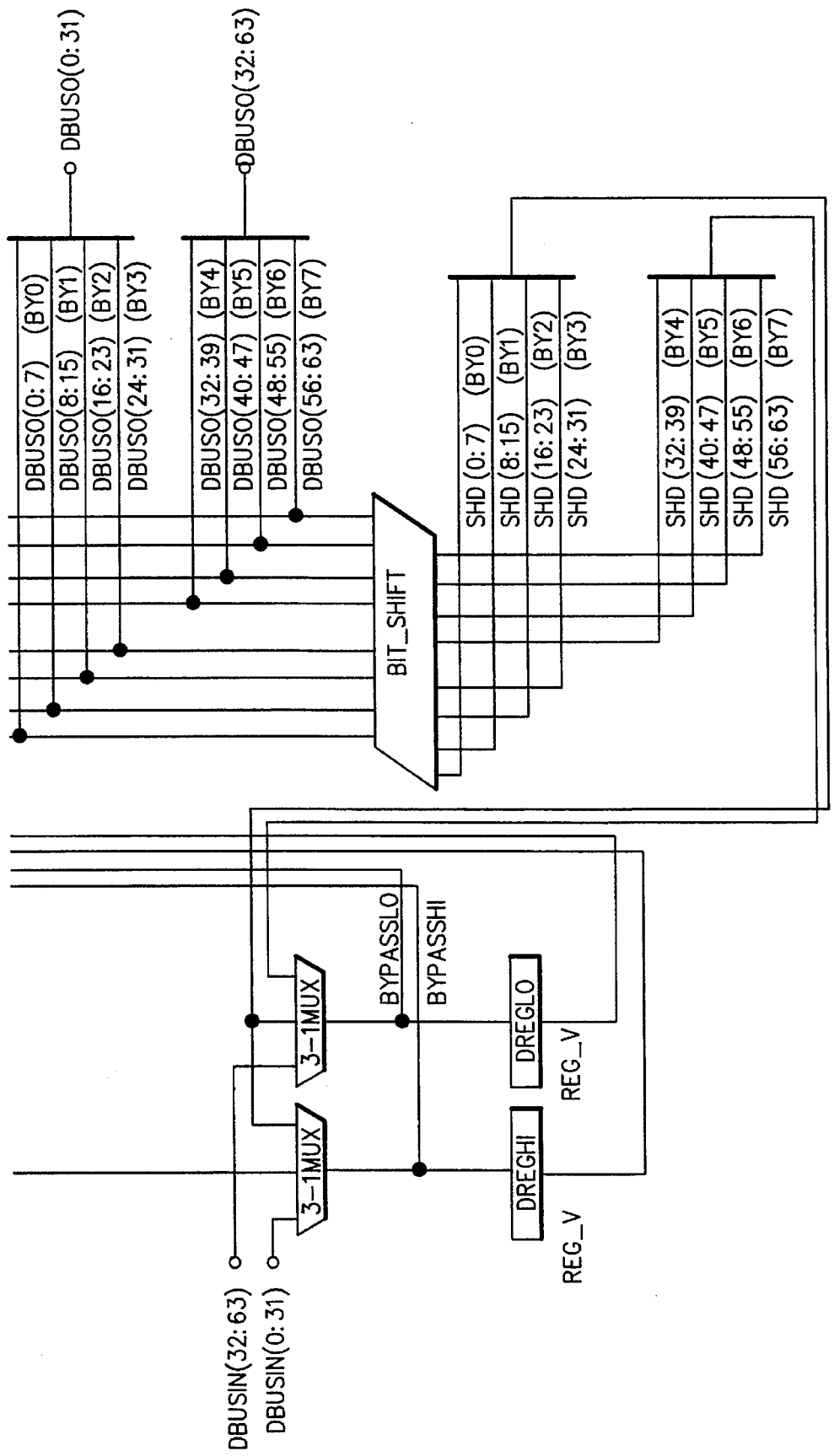
In FIG. 1 (1A and 1B) is shown a simplified dataflow describing a machine organization in which the preferred embodiment might be used. The figure assumes the ESA/370 Architecture and shows an organization supporting the instructions of that architecture supported by the preferred embodiment.

A permutation switch is an interconnection network connecting n inputs with m outputs where any permutation of the n inputs can be presented at its m outputs. A permutation switch is square if the number of its outputs is equal to the number of its inputs, i.e. n is equal to m. For square permutation switches, the number of permutations that can be performed is equal to n! and requires $R^2$ independently controlled paths from the inputs to the outputs. For the case of n equal eight, the square permutation switch can produce 40,320 permutations at the output requiring 64 independent paths.

A cyclic permutation switch is a square permutation switch in which n inputs are interconnected to n outputs in such a manner that the sequence of the inputs is maintained at the output when the inputs are considered to be arranged in a circle. Such a switch can produce n independent results representing the n possible positions for the origin of the sequence. The attainment of these results require n independently controlled groups of paths having n paths for each group. As an example, consider a cyclic permutation switch in which n is eight. Let the inputs to the switch be numbered from zero to seven. Then the eight possible outputs are:

| 0 | 1 | 2 | 3 | 4 | 5 | 6 | 7 |
| 7 | 0 | 1 | 2 | 3 | 4 | 5 | 6 |
| 6 | 7 | 0 | 1 | 2 | 3 | 4 | 5 |
| 5 | 6 | 7 | 0 | 1 | 2 | 3 | 4 |
| 4 | 5 | 6 | 7 | 0 | 1 | 2 | 3 |
| 3 | 4 | 5 | 6 | 7 | 0 | 1 | 2 |
| 2 | 3 | 4 | 5 | 6 | 7 | 0 | 1 |
| 1 | 2 | 3 | 4 | 5 | 6 | 7 | 0 |

To obtain these results, eight independent controls, controlling eight paths each must be generated.

In the discussion to follow, an eight input, eight output square permutation switch is disclosed that operates on a byte unit providing all allowed output permutations of the cyclic permutation switch as well as a limited subset of the additional permutations allowed by the general square permutation switch. In addition, the switch can zero selected outputs. The disclosed switch supports alignment of store operands within a double word, byte rotation for shift operations, and mask operations for the ESA/370 instructions STCM, ICM, and CLM. The switch provides this multiplicity of functions with reduced hardware compared with prior art in which specialized hardware is dedicated for each of the above functions. In addition, despite this savings in hardware, performance is not compromised for any of the ESA/370 instructions. In fact, the cycles per instruction, CPI, for each of the ESA/370 mask instructions has been reduced from that for a machine using an comparable pipelined structure without any delay penalty added to the critical path.

DESCRIPTION OF THE INVENTION

The disclosed switch is being considered for use in a processor for a scalable compound instruction set machine (SCISM) in which up to two instructions can be executed simultaneously by the execution unit. For ease of exposition the operation of the switch is presented within the confines of the simplified dataflow of FIG. 1 without any loss of generality. In this dataflow, the sources of operands and information from which the switch controls are derived have been reduced to include only those necessary to allow a basic understanding of the operation of the switch. The simplified dataflow of FIG. 1 consists of a general purpose register array (GPRARY), a two-to-one ALU (EU), an eight byte bus to storage for reading data (DBUSIN), an eight byte bus for sending data to storage (DBUSO), a 64 bit wide bit shifter (BIT_SHIFT), two three-to-one multiplexers producing two independent four byte bypass busses, BYPASSLO and BYPASSHI, from which two words of data can be staged in registers DREGLO and DREGHI for put away into GPRARY, and/or bypassed to registers L2REG and R2REG for EU and LSH_REG and RSH_REG for PERM_SW, which is the eight input, eight output permutation switch that is the subject of the current invention. In this dataflow, operands for the switch can be sourced to LSH REG from GPRARY and to RSH_REG from GPRARY, DBUSIN(0:31), or D BUSIN(32:63) via BYPASSHI or BYPASSLO, respectively. In addition, the output of the bit shifter, SHO(0:31) can be bypassed to R2REG, a staging register for EU, as DBUSIN(0:31) is being bypassed into L2REG. Finally, SHO(0:31) can be staged into either DREGHI or DREGLO as a staging register for writing these results to either WP0 or WP2 of GPRARY. SHO(32:63) is only staged in DREGLO for writing into WP2 of GPRARY.

Though the simplified dataflow is useful for describing the basic switch operation, the flexibility allowed for storage alignment in ESA/370 along with the SCISM organization in which two instructions can be executed in a single cycle require a more complicated design. As mentioned above, the switch being disclosed was designed to operate in this environment, a design from which the logic diagrams accompanying the description of the switch were selected. Therefore, the logic diagrams reflect the complications that arise from the SCISM ESA/370 organization. These diagrams cannot be understood in the absence of a cursory knowledge of the SCISM ESA/370 hardware and control mechanisms pertinent to the permutation switch. By way of providing the needed knowledge, an overview of the SCISM ESA/370 hardware and controls is presented in the next two sections.

SCISM ESA/370 Processor Hardware Overview

To support the goal of the SCISM ESA/370 processor of simultaneously executing up to two ESA/370 instructions within the execution unit, duplicate hardware has been implemented when justified by performance modelling. Due to this duplication, the execution unit conceptually consists of left and right units. A pair of instructions executing in parallel, i.e., one on the left and one on the right, is known as a Compound Instruction. These units possess unique address generation hardware and ALU's but share the permutation switch being described as well as a bit shifter and storage interface. The left unit's address unit hardware is denoted as AU while the right unit's is denoted as HU. Since the units share the storage interface, the output from AU, AUO(0:31), is multiplexed with the output of HU, HUO(0:31), to produce an effective storage address, EA(0:31), for the storage access. Though the generation of storage addresses is the main function of AU and HU, they are also used to generate shift amounts for ESA/370 shift instructions.

In addition to the above hardware, two eight bit registers, W1(0:7) and W2(0:7) are provided for holding the storage operand lengths. These registers are primarily used to hold the first and second operand lengths of an ESA/370 SS instruction with the length of the first operand held in W1 and the length of the second operand in W2. A four bit register MMASK(0:3) is also provided to hold the mask contained in the ESA/370 mask instructions, STCM, ICM, and CLM.

SCISM ESA/370 Processor Control

The SCISM ESA/370 processor is controlled by horizontal microcode. Fields are designated within the microword for specifying the operation to be performed by each of the functional units implemented in hardware and to control the supply of operands to these functional units. The pertinent fields with respect to the design of the permutation switch are:

| Field | Field Description |
|---|---|
| SH_AMT(0:1) | controls the generation of the shift amount for shift operations |
| SH_OP(0:3) | designates the operation to be performed by the permutation switch and bit shifter |
| STC_LEN(0:2) | controls the generation of the storage length |
| STC_ALIGN(0:1) | specifies how data has been loaded into LSH_REG and RSH_REG, the staging registers holding the operands for the shifter. |

The encoding for each of these fields is provided below. The quantities in braces indicate to which ESA/370 instruction(s) a particular encoding applies.

| SH_AMT(0:1) Value | Function - Shift Amount |
|---|---|
| 0 | EA - Byte rotate per EA (29:31) |
| 1 | HUO - Shift amount per HUO (26:31) {SLL, SLA, SRL, SRA compounded on right} |
| 2 | AUO - Shift amount per AUO (26:31) {SLL, SLA, SLDL, SLDA, SRL, SRA, SRDL, SRDA} |
| 3 | K - Shift amount per K3 (0:5) |

| SH_OP (0:3) Value | Function - Shift Operation |
|---|---|
| 0 | RIGHTLOG - Right logical shift, pad with 0 {SRL, SRDL} |
| 1 | RIGHTARTH - Right arithmetic shift, pad with sign {SRA, SRDA} |
| 2 | LEFTLOG - Left logical shift, pad with 0, shift through bit 0 {SLL, SLDL} |
| 3 | LEFTARTH - Left arithmetic shift, pad with 0, preserve bit 0 {SLA, SLDA} |
| 4 | PACK - Pack, signed if SH_AMT (1) = 1, unsigned otherwise |
| 5 | UNPACK - Unpack, signed if SH_AMT (1) = 1, unsigned otherwise |
| 6–7 | reserved |
| 8 | GATHER - Gather LSH_REG to SHO (0:31) using MMASK (0:3) {CLM} |
| 9 | ROTATE - Gather LSH_REG using MMASK (0:3) and rotate per EA (29:31) {STCM, all stores if MMASK = X'F'} |
| 10 | MERGE - Merge RSH_REG with LSH_REG to SHO (0:31) using MMASK (0:3) {ICM} |
| 11 | reserved |
| 12–15 | KMERGE - Merge RSH_REG with LSH_REG to SHO (0:31) using K4 (0:3) |

| STC_LEN (0:2) Value | Function - Length |
|---|---|
| 0 | 1 - Length is 1 byte |
| 1 | 2 - Length is 2 bytes |
| 2 | 4 - Length is 4 bytes |
| 3 | 8 - Length is 8 bytes |
| 4 | LW1 - Length is in W1 (5:7) (origin 0) |
| 5 | LW2 - Length is in W2 (origin 0, 8 bytes or W2 (5:7)) |
| 6 | DBDY - Length is - AUO (29:31) |
| 7 | LLW2 - Length is in W2 (5:7) (origin 0) |

| STC_ALIGN (0:1) Value | Function - Alignment Control |
|---|---|
| 0 | reserved |
| 1 | ROTLSH3 - Rotate the data in LSH_REG‖RSH_REG: the right-most byte of the data is considered to be in LSH_REG byte 3. Restriction - $0 \leq LEN \leq 3$, where LEN is the zero-origin actual length of the write data. |
| 2 | ROTLSHO - Rotate the data in LSH_REG‖RSH_REG: the left-most byte of the data is considered to be in LSH_REG byte 0. |
| 3 | ROTRSH3 - Rotate the data in LSH_REG‖RSH_REG: the right-most byte of the data is considered to be in RSH_REG byte 3. |

With this overview of the pertinent SCISM ESA/370 processor hardware and controls, the execution of the permutation switch is described as follows. For each operation supported by the switch, the execution of the operation is explained using the simplified dataflow shown in FIG. 1. First, the operation of the switch to align store operands within the double word storage bus is discussed. Next, the operation of the switch is expanded to include mask operations for STCM after which an explanation of the execution of mask operations for CLM and ICM, respectively, is presented. The explanation of the switch's operation is concluded with a description of the switch's operation to support shift instructions. As each operation is described, diagrams of the logic taken from the SCISM ESA/370 processor design are referenced to clarify the implementation of the presented concepts. Signals other than required to support the simplified dataflow are explained as required.

Figure 2B:
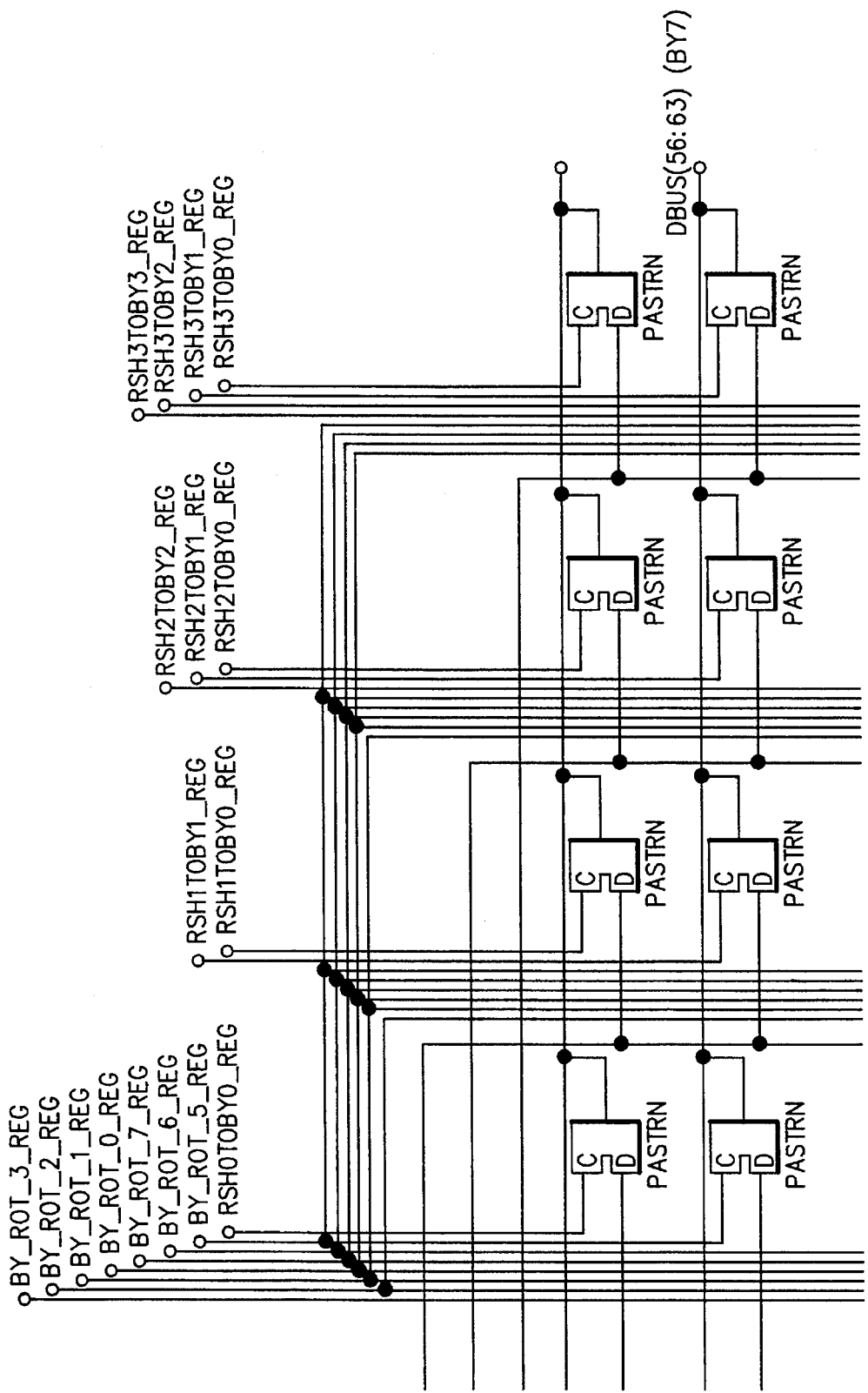
In FIG. 2 a logical description of the preferred embodiment is shown.
Figure 2C:
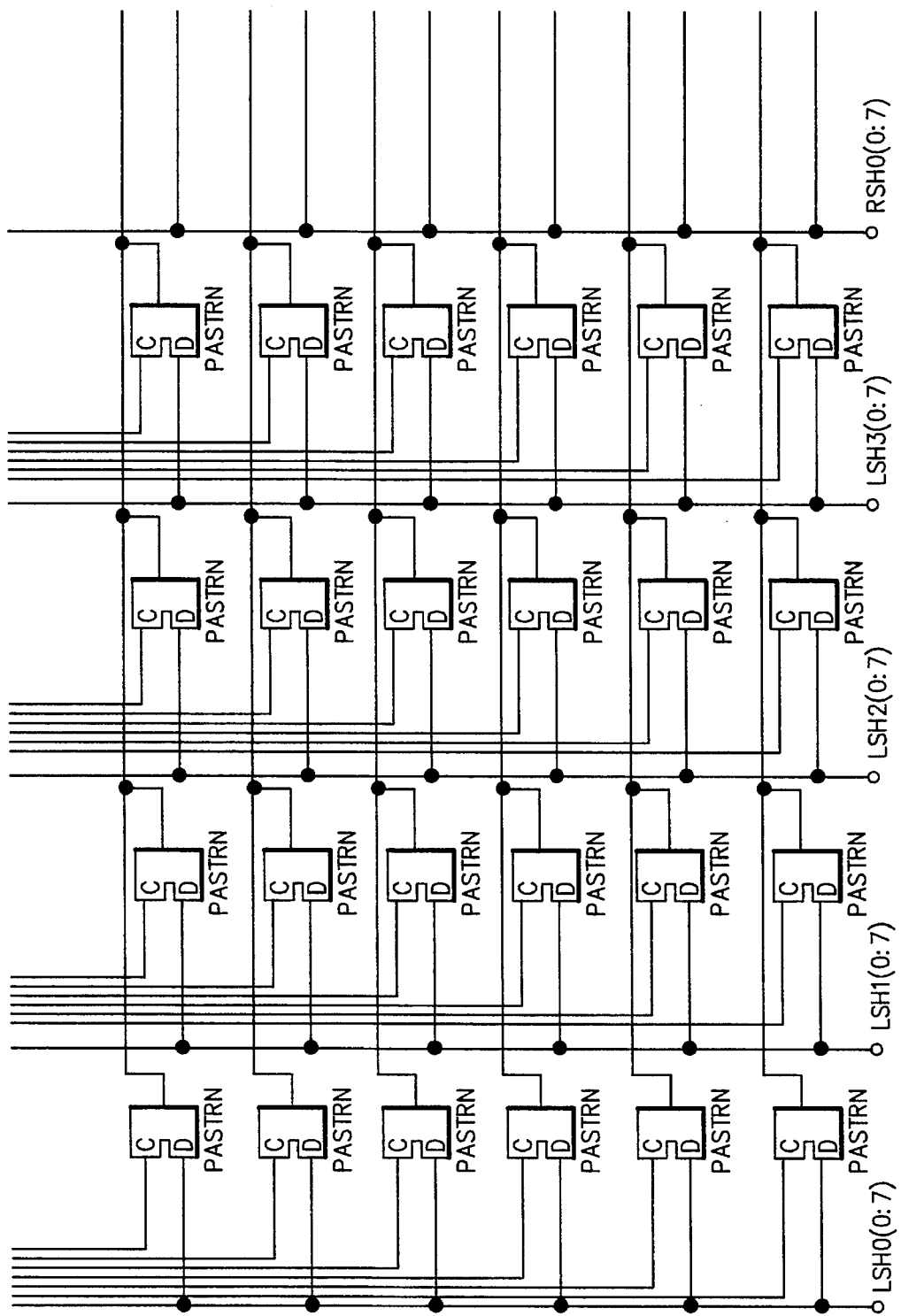
Figure 2D:
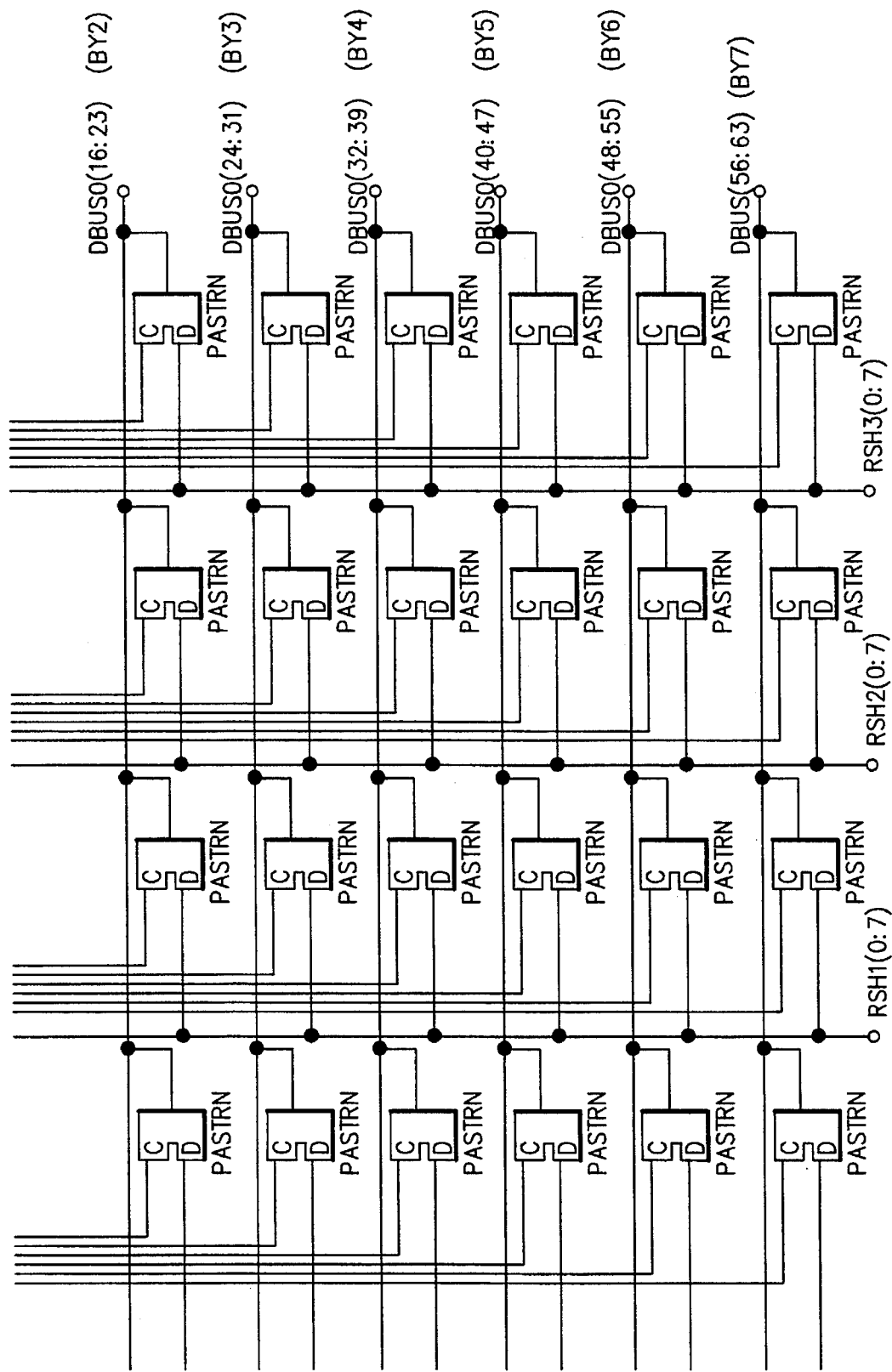
Figure 15:
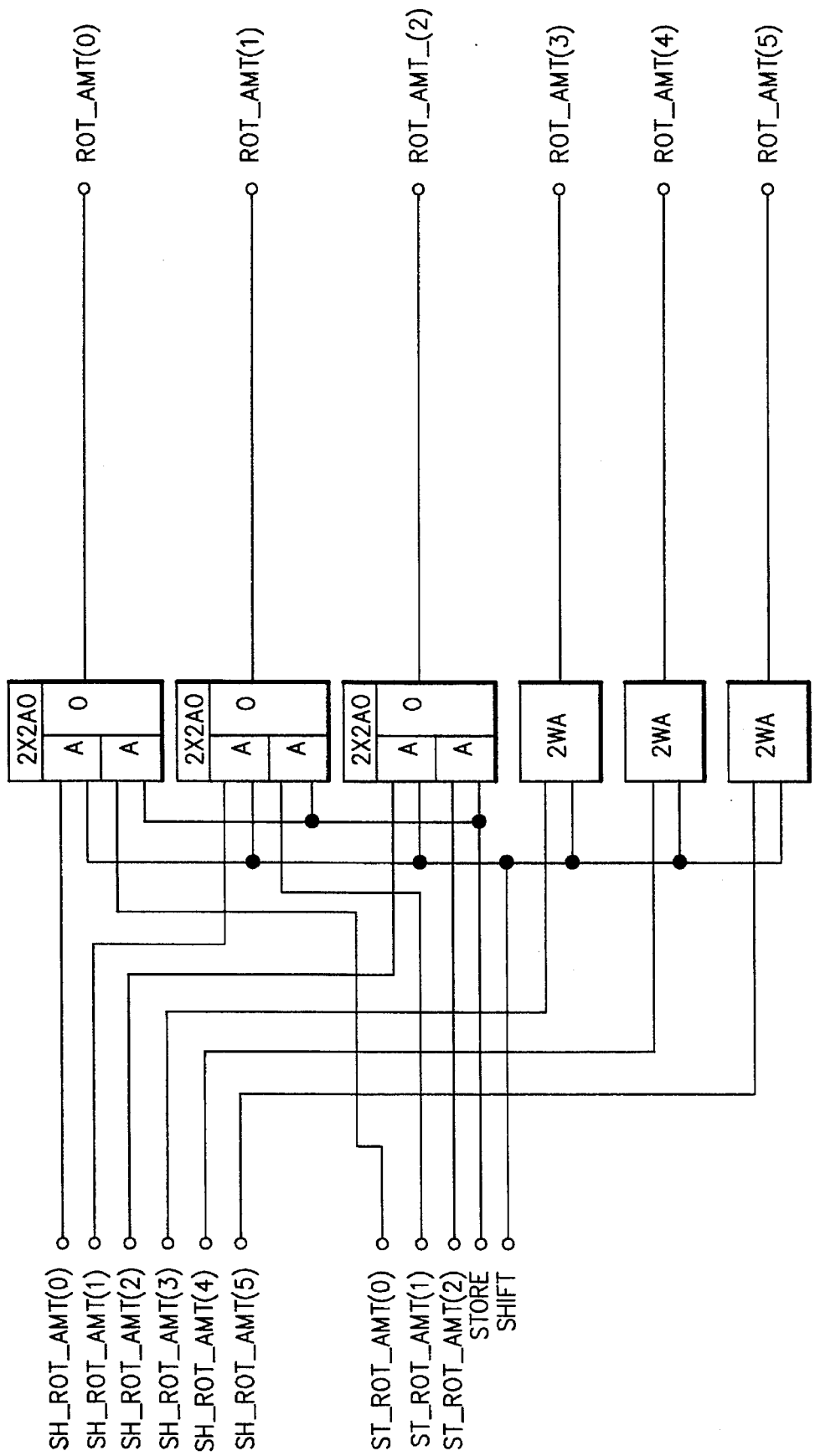
In FIG. 15 is shown logic that selects between the rotation amount generated for shift operations and rotation amounts that are generated in support of store operations to be fed to the rotation amount decode logic.
Figure 16:
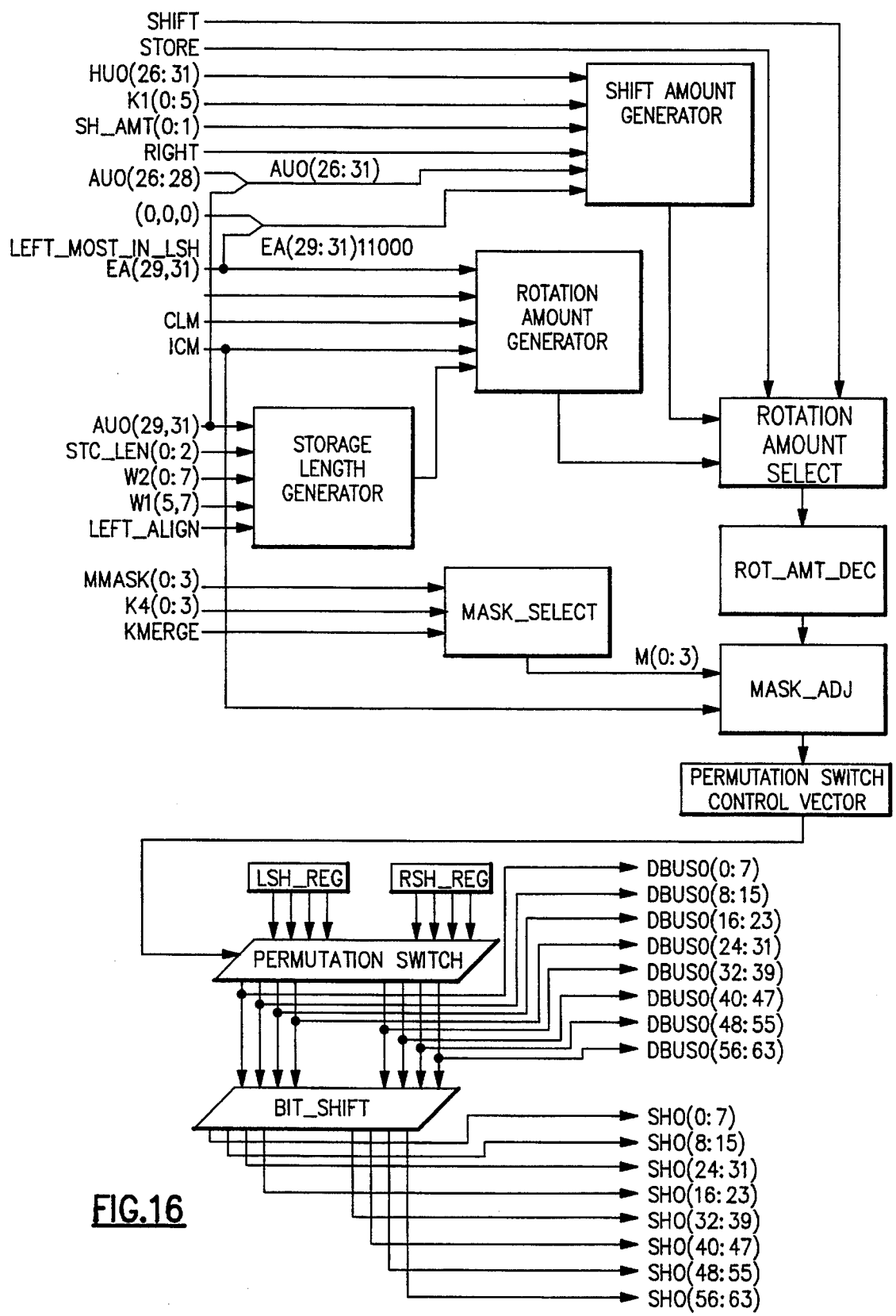
In FIG. 16 is shown an overview of the preferred embodiment of our multi-function permutation switch in which the upper left section of the diagram illustrates the controls required produce the desired switching operations and the permutation switch and associated latches are shown in the lower right.

As we discuss our permutation switch it may be useful for the reader to review the overview summary contained in FIG. 16 in which the upper left section of the diagram illustrates the controls required to produce the desired switching operations and the permutation switch and associated latches are shown in the lower right. There the switch, the internal construction of which is illustrated by FIG. 2, is shown as PERM_SW, with its input registers, LSH_REG and RSH_REG. The element ST_LEN_GEN (shown in FIG. 3) supplies an output to the element ST_ROT_GEN (shown in FIG. 4). The element SH_AMT_GEN (shown in FIG. 14) supplies its output, along with the output of ST_ROT_GEN to the element ROT_AMT_SEL (shown in FIG. 15) whose output is supplied to the element ROT_AMT_DEC (shown in FIG. 5). The output of ROT_AMT_DEC along with the output of MASK_SEL (shown in FIG. 13) is supplied along with the ICM signal to the mask adjustment logic, MASK_ADJ (shown in FIGS. 6-11) for alignment. These controls are then latched in the element PERMSWCTLVCT (shown in FIG. 12). This latch supplies controls for the multifunction permutation switch, PERM_SW. The output of PERM_SW can then be supplied to a conventional bit shifter illustrated by BIT_SHIFT in FIG. 16. Shift operations, as illustrated in the SH_OP function above, can then be executed by the conventional switch. Additionally, the output of PERM_SW is supplied to the data cache or storage subsystem via lines DBUSO(0:63). Store data is aligned by PERM_SW and transmitted to the cache (storage subsystem) on these lines.

Store Operations

While the basic memory unit for the ESA/370 architecture is a byte, the SCISM processor implements an eight byte data interface to the data cache. This eight byte interface increases the bandwidth for storage operand accesses as well as facilitating the attainment of double word concurrency that is imposed by the ESA/370 architecture on selected operand accesses. The basic memory unit of a byte along with the double word interface requires that an operand be aligned within a double word during storage accesses. The permutation switch being disclosed aligns operands within a double word for all stores executed by the SCISM processor. To perform this alignment, the switch must first determine the location within LSH REG and RSH_REG of the byte that corresponds to the effective address of the store and then rotate the data until this byte aligns with the byte position within the double word as specified by the three least significant bits, LSB's, of the effective address. All of the rotated bytes are then placed on the data bus, DBUSO, and sent to the data cache. Because the basic memory unit is a byte, this can cause invalid data to be placed on the bus. The data cache is responsible for extracting only the valid data as indicated by the least significant three bits of the effective address along with the store data length. In preparation for the discussion to follow, let the bytes within LSH_REG and RSH_REG be numbered consecutively from zero to seven with the left most byte of LSH_REG, LSH0, being zero and the right most byte of RSH_REG, RSH3, being seven. Similarly, let the byte positions on the data bus, DBUSO, be numbered consecutively from zero to seven with byte zero corresponding to DBUSO bits, DBUSO(0:7), and byte seven corresponding to DBUSO bits, DBUSO(56:63). Furthermore, to distinguish input bytes from output bytes using this numbering scheme, let the input bytes be denoted as BYIN0, BYIN1 , . . . , BYIN7 and the output bytes be denoted as BY0, BY1 , . . . , BY7. This numbering scheme is shown in FIG. 1. As an example of the alignment executed by the permutation switch, assume that the data to be stored is read into LSH REG and RSH REG such that LSH0, BYIN0, corresponds to the effective address, LSH1, BYIN1, corresponds to the effective address plus one and so forth. In addition, assume that the three LSB's of the effective address are '011' binary. For these assumptions, the data in LSH_REG and RSH_REG must be passed through the switch so that LSH0 aligns with byte position three of DBUSO, i.e. BY3, with the sequence of the input bytes maintained. Thus, the switch is to perform as a cyclic square permutation switch as it maintains the sequence of the input bytes when these bytes are considered to be arranged in a circle while allowing the routing of the input bytes to any of the possible output byte positions of the switch.

The previous example, in which the data is read into LSH_REG and RSH_REG so that the byte in LSH0 corresponds to the effective storage address is representative of the situation that would occur when the processor executes the ESA/370 Store (ST) instruction. In the ST instruction, a four byte register, R1, is to be stored at the address calculated by the addition of a base register, index register, and a displacement. The register R1 is read to LSH_REG to execute the store with LSH0 corresponding to the effective storage address. Not all operands to be stored by an ESA/370 instruction can be read into LSH REG and RSH REG with byte LSH0 corresponding to the effective address. An example of this situation would be the ESA/370 instruction Store Halfword (STH). For this instruction, bits 16 through 31 (a half-word) of a register, R1, are to be stored at the storage address produced in an identical manner as for ST. As for ST, R1 is fetched to LSH REG; however, for STH, the byte corresponding to the effective address is in LSH2. As a result, a mechanism must be provided that determines which byte within LSH_REG and RSH_REG corresponds to the effective storage address before storage alignment can be performed. An analysis of the ESA/370 instruction set shows that the storage operand may be read into LSH_REG and RSH_REG in one of three ways producing three cases. To describe the resulting three cases, let the byte of data corresponding to the low order address be denoted as the left most byte of data. The data continues sequentially to the right for a number of bytes equivalent to the store length until the right most byte of data is reached. Using this terminology, the cases are: 1. the right most byte of data is in RSH3 (as in storage of decimal operands), 2. the right most byte of data is in LSH3 (as in STH), and 3. the left most byte of data is in LSH0 (as in the above example of ST).

Consider the determination of the rotation amount required to execute the first case in which the right most byte of data is located in RSH3. The left most byte can reside in either LSH REG or RSH REG. Using the numbering scheme described above, the location of this byte can be found by subtracting the storage operand length from seven. This subtraction will yield a number between zero and seven since the length is between zero and seven unit origin. Let this number be represented by X, then the left most byte of the storage operand is BYINX. This byte must be rotated so that it aligns with the byte position designated by the three LSB's of the effective store address. Again using the above numbering scheme, these three LSB's specify one of BY0, BY1, . . . , BY7. Denoting the three bit number specified by the three LSB's of the effective address with Y, then BYINX must align with BYY. Therefore, X plus the rotation amount must equal to Y. The above arithmetic operations are to be executed in modulo-8 since eight bytes are to be rotated. The above operations can be summarized as follows.

$$X=7-ST\_LEN$$

$$Y=X+ROT\_AMT$$

where ST_LEN and ROT_AMT represent the 3 bit storage length, unit origin, and rotation amount in bytes, respectively. Since the arithmetic is performed modulo 8, a value of eight for ROT_AMT implies a rotation amount of zero. From these expressions, ROT_AMT can be found from:

$$ROT\_AMT=Y-X$$

$$ROT\_AMT=Y-(7-ST\_LEN)$$

$$ROT\_AMT=Y-7+ST\_LEN$$

Let Y be designated by EA since Y represents the three LSB's of the effective address. Then $$ROT\_AMT=EA+ST\_LEN-7$$

This operation is to be performed using modulo 8 arithmetic; therefore, $$ROT\_AMT=(EA+ST\_LEN-7)modulo8$$

Applying the property of modulo arithmetic, $$(X + Y)moduloz = (Xmoduloz + Ymoduloz)moduloz$$
$$(EA + ST\_LEN - 7)modulo8 \text{ can be expressed as:}$$
$$(EA + ST\_LEN - 7)modulo8 = ((EA + ST\_LEN) + (-7))modulo8$$
$$= ((EA + ST\_LEN)modulo8 + (-7)modulo8)modulo8$$

Let the values represented in the above equation be represented by two's complement numbers with four bits. Four bits are chosen for the representation to allow a positive seven to be represented. Using the property of two's complement number representations, $$N^-+N^+=2^n$$

where $N^-$ is the negative two's complement representation of N, $N^+$ is the positive two's complement representation of N, and n is the number of bits used to represent the number, then the negative two's complement representation for seven using a four bit representation is:

$$7^-=2^431 \ 7^+=16-7=9$$

Substituting this for (−7) produces:

$$(EA + ST\_LEN - 7)modulo8 = ((EA + ST\_LEN)modulo8 + 9modulo8)modulo8$$
$$= ((EA + ST\_LEN)modulo8 + 1modulo8)modulo8$$
$$= ((EA + ST\_LEN) + 1)modulo8$$
$$= (EA + ST\_LEN + 1)modulo8$$

Therefore, ROT_AMT can be expressed as:

$$ROT\_AMT=(EA+ST\_LEN+1)modulo8$$

Next, consider the execution of the second case in which the right most byte of data is located in LSH3. As for the first case, the left most byte of data must be found so that the data can be aligned within the double word of storage. This byte can be found in a fashion that is similar to that for the first case. For the current case, however, the storage length must be subtracted from three rather than seven to determine the left most byte of the operand that corresponds to the effective address. Thus, $$X=3-ST\_LEN$$

As before, $$Y=X+ROT\_AMT$$

so that $$ROT\_AMT=Y-X$$

$$ROT\_AMT=Y-(3-ST\_LEN)$$

$$ROT\_AMT=Y+ST\_LEN-3$$

As before, letting Y be designated by EA since Y represents the three LSB's of the effective address produces:

$$ROT\_AMT=EA+ST\_LEN-3$$

This computation is to be performed modulo 8; therefore, $$ROT\_AMT=(EA+ST\_LEN-3)modulo8$$

Applying the above arguments for changing modulo 8 subtraction to addition, ROT_AMT can be calculated as:

$$ROT\_AMT=(EA+ST\_LEN+5)modulo8$$

Finally, consider the determination of the rotation amount that is required to align the storage data for case three. The determination of the rotation amount for this case is identical to that of case two if the storage length used for calculating the rotation amount is forced to three (four bytes) when the data is left aligned in LSH_REG. Though the three-to-one addition always produces EA for this condition, generating ROT_AMT in this manner allows the use of a two-to-one multiplexer versus a three-to-one multiplexer in the critical path for generating the switch controls.

For each of the above cases, the switch rotates the data right the number of byte positions corresponding to ROT_AMT with all of the input bytes output on DBUSO. To perform this operation, ROT_AMT is decoded using a three-to-eight decoder into eight control signals indicating rotation amounts ranging from zero to seven bytes with only one of the eight signals activated at a given time. For store operations, these eight control signals are sufficient to control the switch since for store alignment the switch functions as a cyclic permutation switch. The disclosed switch, however, has also been designed to support 'gather' and 'spread' operations that are required by the ESA/370 mask instructions, STCM, ICM, and CLM. The support of these operations, which will be described later, requires that the switch support a larger subset of the permutations provided by an 8×8 general permutation switch than the subset supplied by an 8×8 cyclic permutation switch. Nevertheless, the support of all the permutations provided by the 8×8 general permutation switch is not required. To minimize hardware, the switch has been designed to support only those additional permutations required by the mask instructions. Support of these permutations requires that many of the paths from input to output of the permutation switch be controlled independently. The resulting controls are shown at the top of FIG. 2 with the generation of these controls shown in FIGS. 3 to 11.

Figure 3:
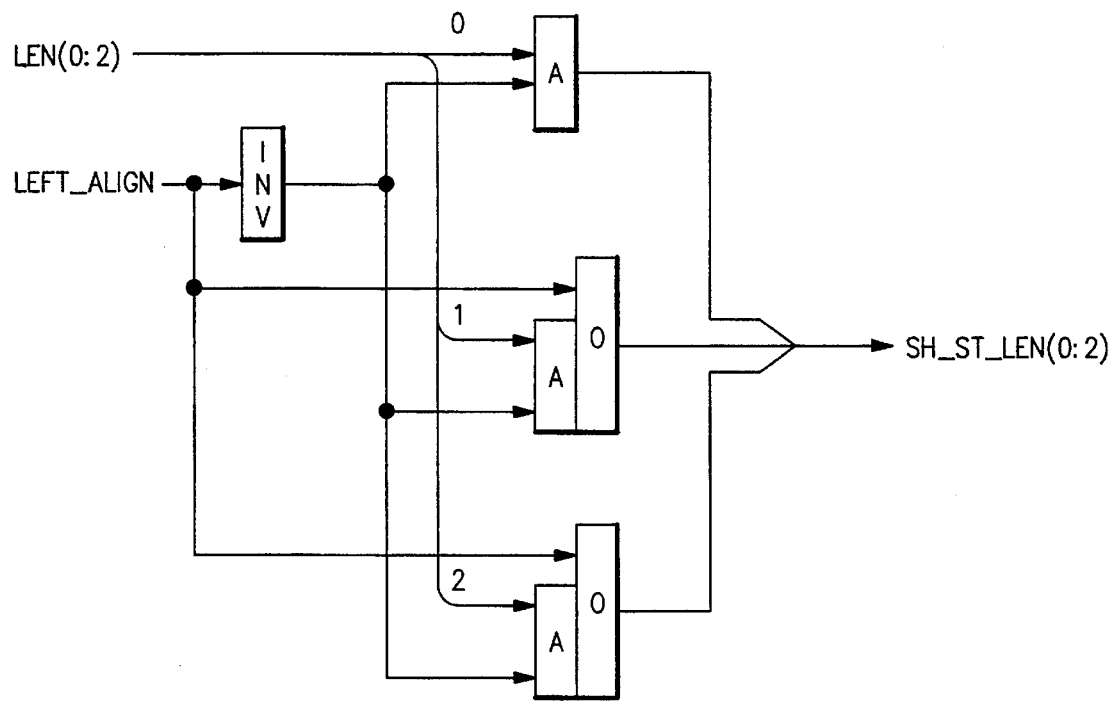
In FIG. 3 logic generating the storage length which is required to control the preferred embodiment when aligning data within a double word boundary for store operations is shown.

FIG. 3 shows the logic for generating the storage length for a store operation in the SCISM ESA/370 environment. As described in section "SCISM ESA/370 Processor Control" on page 17, the STC_LEN(0:2) field of the microinstruction controls the generation of this storage length. As indicated by these controls, the storage length, LEN(0:2) in FIG. 3, is directly generated by logic (not shown) as either one, two, four or eight bytes or is selected from W1(5:7), W2(5:7), or the logical inversion of AUO(29:31). For one encoding of STC_LEN(0:2), when the encoding is '101' binary, W2(0:4) is used to determine whether the store length specified by the W2 length register exceeds eight bytes. If so, a length of eight, unit origin ('111', zero origin), is asserted for the SH_ST_LEN (in FIG. 3); otherwise, W2(5:7) is selected as the SH_ST_LEN.

There is one case in which the hardware overrides the setting of the STC_LEN field of the microword. This occurs when the left most byte of the store operand is read into LSH0 (case 3 above). For this case, STC_ALIGN(0:1) is encoded with '10' binary. The '10' binary in this field causes the LEFT_ALIGN signal to be activated to a logic one. A logic one on LEFT_ALIGN causes the logic of FIG. 3 to produce '011' binary on SH_ST_LEN(0:2) which indicates a store length of four since SH_ST_LEN(0:2) is zero origin.

Figure 4:
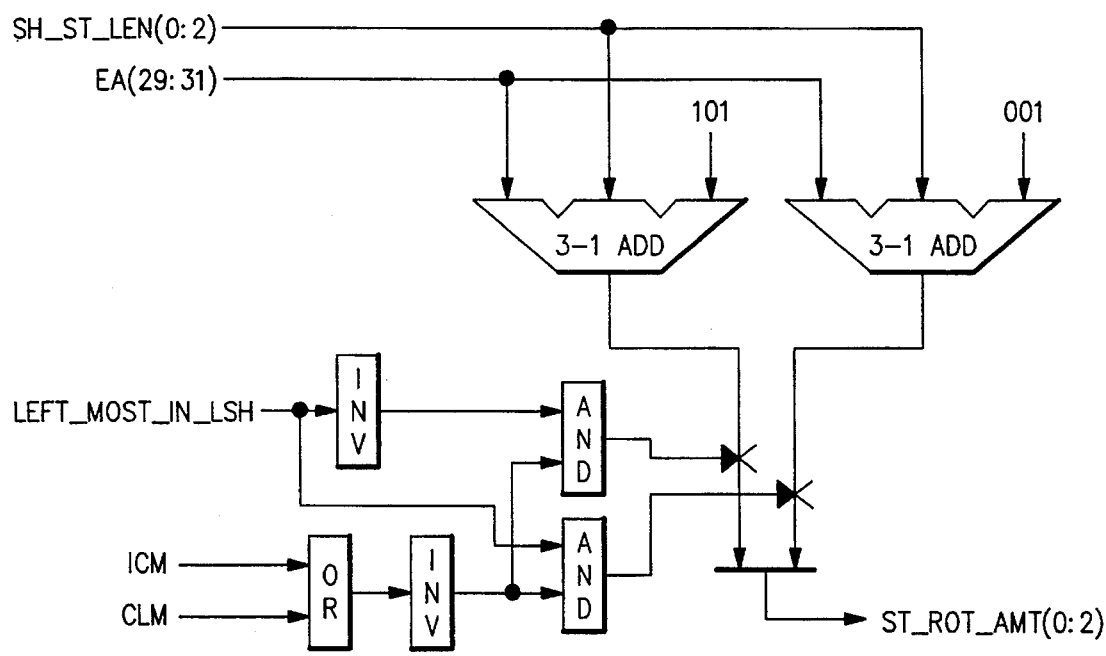
In FIG. 4 logic implementing two algorithms required for determining the rotation amount that must be executed by the preferred embodiment to support storage alignment within a double word boundary during store operations is shown. Also shown is logic used to select the rotation amount for a storage operation from the results of the two algorithms.

The storage length produced by the logic of FIG. 3 is correct for implementing the algorithms derived above for determining the rotation amount required for aligning store operands within a double word. The hardware implementation of these algorithms is shown in FIG. 4. Both of the algorithms:

$$ROT\_AMT=(EA+ST\_LEN+1) \bmod 8$$

and $$ROT\_AMT=(EA+ST\_LEN+5) \bmod 8$$

derived above, are calculated in parallel by the substitution of SH_ST_LEN(0:2) produced in FIG. 3 for ST_LEN, and EA(29:31), the three LSB's of the effective store address, for EA. With these substitutions, the appropriate algorithm is selected by the signal LEFT_MOST_IN_LSH to produce ST_ROT_AMT(0:2) of FIG. 4, where the resulting ROT_AMT has been designated as ST_ROT_AMT to distinguish it from the shift rotation amount to be discussed later. In FIG. 15, the selection of ST_ROT_AMT(0:2) as the ROT_AMT, for stores, is shown. LEFT_MOST_IN_LSH, generated by decode of STC_ALIGN(0:1), is set to select (EA(29:31)+SH_ST_LEN(0:2)+1)modulo8 when STC_ALIGN(0:1) is '11' binary and set to select (EA(29:31)+SH_ST_LEN(0:2)+5)modulo8 when STC_ALIGN(0:1) is either '01' or '10' binary, consistent with the encoding of the STC ALIGN(0:1) control field of the microinstruction as described above. The signals ICM and CLM are used to force the rotation amount for those instructions to zero, a requirement that will be explained below. They are produced by the decode of SH_OP(0:3). The resulting ROT_AMT of FIG. 15 is decoded by the three-to-eight decoder shown in FIG. 5 producing the signals BY_ROT_0 to BY_ROT_7. These signals are sufficient to control an 8×8 cyclic permutation switch as required by store operations. These controls, however, are expanded as shown in FIG. 6 to FIG. 11 to support mask operations. The expansion to be performed by the logic in FIG. 6 to FIG. 11 will be described in the description of mask operations.

To clarify the execution of byte alignment for store operations, consider the previous example in which the data was left aligned in LSH_REG and EA was three. For this example STC_ALIGN(0:1) is '10' binary causing LEFT_ALIGN to be a one. This forces SH_ST_LEN(0:2) to be '011' binary despite the encoding of STC_LEN(0:2). The STC_ALIGN(0:1) field being '10' also sets LEFT_MOST_IN_LSH to choose the results of the addition of EA(29:31), SH_ST_LEN(0:2), and '101' binary. Since the operation is a store, the STORE signal in FIG. 15 is one; thus, ROT_AMT=ST_ROT_AMT, and $$ROT\_AMT=(EA(29:31)+SH\_ST\_LEN(0:2)+5) \bmod 8$$

ROT_AMT=3

ROT_AMT is fed to the three-to-eight decoder (FIG. 5) which asserts BY_ROT_3. For this case, the permutation switch must route LSH0 to BY3, LSH1 to BY4, LSH2 to BY5, LSH3 to BY6, RSH0 to BY7, RSH1 to BY0, RSH2 to BY1, and RSH3 to BY2. To support mask operations, all of these paths except RSH0 to BY7 must be controlled independently; therefore, the BY_ROT_3 must be expanded into controls LSH0TOBY3, LSH1TOBY4, LSH2TOBY5, LSH3TOBY6, RSH1TOBY0, RSH2TOBY1, and RSH3TOBY2. The control BY_ROT_3, however, is sufficient to control the path RSH0 to BY7. The resulting expansion is performed by the logic shown in FIG. 6 to FIG. 11 with the results latched in the switch control vector, PERMSWCTLVCT, shown in FIG. 12. The signals from this vector control the routing of data through the switch as shown in FIG. 2. In this figure, an input byte to the switch is routed through the PASTRN block to the output byte. The D input to the PASTRN block is the byte of data to be routed to the output while the C input represents the control to that block. If the control signal is asserted, the byte is routed to the output. Such a block can be implemented with eight pass transistors, one for each bit of the byte. Alternatively, one whole row of the switch can be implemented with eight 8-1 by 8 bit multiplexers. In FIG. 2 the seven expanded controls latched in PERMSWCTLVCT in FIG. 12 can be found as controlling inputs to the switch. The latched, unexpanded control, controlling the routing of RSH0 to BY7, is represented as BY ROT 3 REG, which was also latched in PERMSWCTLVCT in FIG. 12. Other control signals are inactive. The assertion of signals in this manner can be seen from the figure to perform the desired alignment. All eight input bytes are routed to DBUS0 regardless of the store data length. As a result, invalid bytes of data can be placed on DBUS0. As stated above, the data cache is responsible for extracting only the valid bytes of data as indicated by the least three bits of the effective address and the store data length.

Mask Operations

In this section, the operation of the permutation switch to support the ESA/370 mask operations, STCM, ICM, and CLM is described. Before describing the execution of these instructions, it is noted that in the SCISM ESA/370 processor, mask operations specifying a mask of '0000' binary are treated as exceptional cases. As a result, they become NOP's for the switch. Therefore, the following discussion applies to mask instruction in which the mask in not '0000' binary. Such mask operations require that the permutation switch perform 'gather' or 'spread' operations at the alignment position. These operations require that many of the paths from input to output of the switch be enabled or disabled independently from other paths. The switch controls must be expanded to allow sufficient controls for this independent enabling and disabling of paths. In this section, the expansion of the controls is discussed. First, the operation of the switch to support the instruction STCM is discussed with the corresponding expansion of control signals explained. A similar discussion of CLM operations follows. Finally ICM operations are discussed.

STCM Operations

The Store Character Under Mask (STCM) ESA/370 instruction stores selected bytes from a general purpose register, GPR, at the indicated storage address. The bytes to be stored are specified by a mask contained within the instruction. To execute this instruction, referring to FIG. 1, the GPR to be stored is first read into LSH_REG with the left most byte of data read to LSH0. Therefore, STC_ALIGN(0:1) is encoded with '10' binary. As a result of this encoding, '011' binary is generated on SH_ST_LEN(0:2) by the logic in FIG. 3 as was discussed in section "Store Operations" on page 21. Alignment of the store data proceeds as for case three in section "Store Operations" on page 21 by generating ROT_AMT per the appropriate algorithm presented in that section. ROT_AMT is then decoded by the three-to-eight decoder of FIG. 5 to assert one of eight signals indicating the alignment to be performed. These eight signals are fed to the mask adjustment block (MASK_ADJ in FIG. 16) along with a four bit mask that is extracted from the ESA/370 instruction STCM. This four bit mask must be decoded to determine which bytes of the GPR are to be selected for storage at the alignment position within the double word. The signals to be asserted to the switch must then be adjusted to 'gather' the selected bytes from LSH_REG at the alignment point within the double word.

The operation of the mask adjustment block (MASK_ADJ in FIG. 16) can be understood as follows. Recall that only one of eight signals from the three-to-eight decode of the rotation amount is asserted at a given time. Each of these signals is sufficient to control a cyclic 8×8 permutation switch by controlling eight of the possible 64 paths from the inputs of the switch to its outputs. The assertion of one of these eight signals from the three-to-eight decoder, however, is insufficient to perform the 'gathering' function required to support STCM when all bytes of the operand are not selected by the mask for storage. For these cases, in which the mask is some value other than '1111' binary, some of the bytes that would be stored if the mask were '1111' binary are no longer required to be routed through the switch. Paths routing these bytes from the input of the switch to its output, therefore, must be disabled. The bytes that are to be stored, however, are to be stored in contiguous locations of memory requiring the bytes selected for storage to be 'gathered' at the point of alignment. Gathering these bytes consists of the disabling of appropriate paths from the input of the switch to its output along with the enabling, in lieu of these disabled paths, of other paths that route data to an output that is to the left of the output to which the byte would have been routed by the disabled path. This enabling and disabling of paths is achieved by suppressing control signals that would otherwise be asserted and asserting other control signal in their place. The suppression and activation of these controls is performed by the logic shown in FIG. 6 to FIG. 11. It results in an expansion of the control signals for controlling the permutation switch since many of the paths must be controlled independently of other paths.

Figure 13:
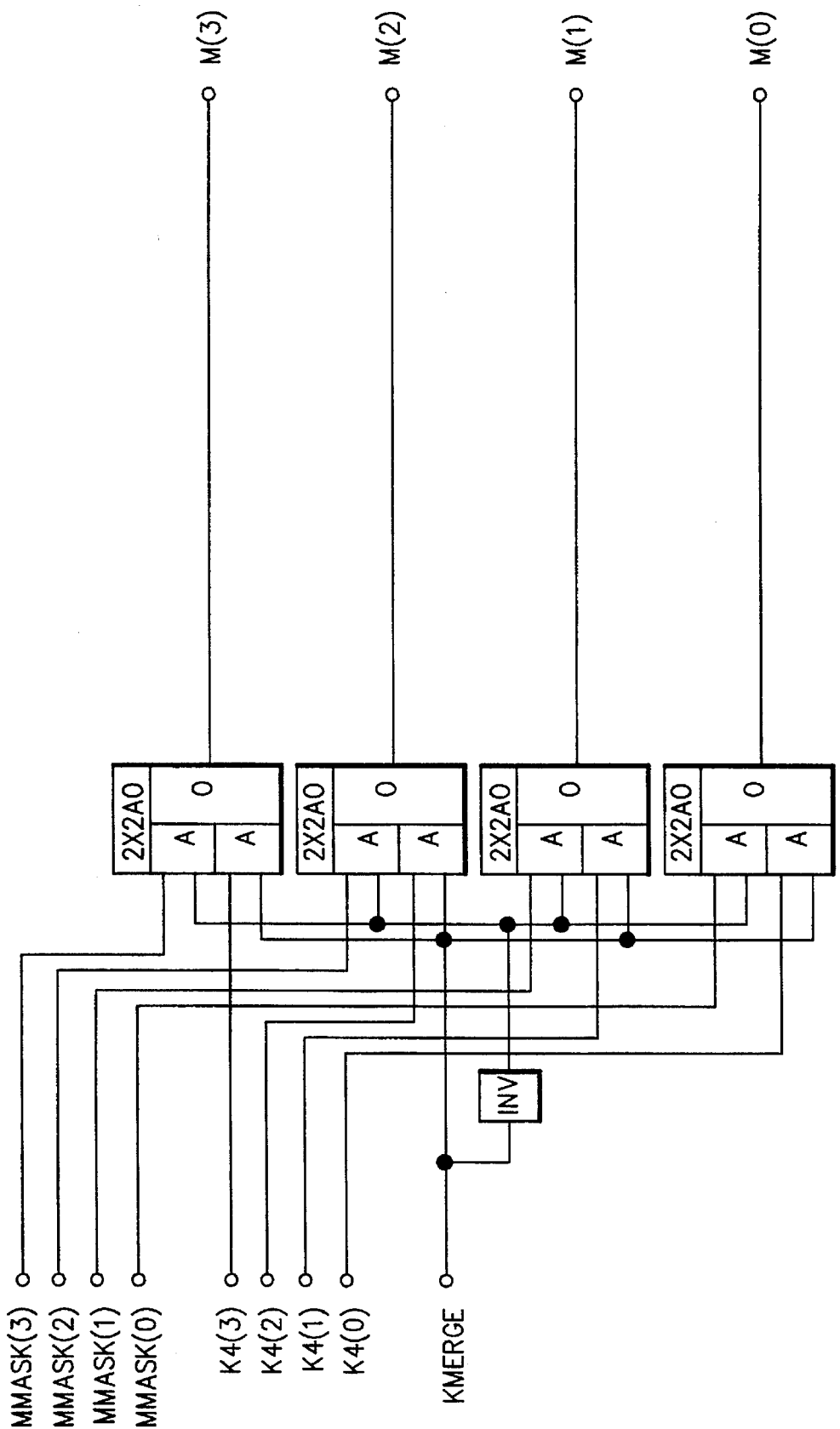
In FIG. 13 is shown the generation of the mask bits that are used in FIG. 6 to FIG. 11 to adjust the storage rotation amount decode signals to support gather and spread operations.

Before turning to an example of the 'gathering' function performed by the permutation switch, consider the execution of a STCM in which the mask is '1111' binary. In this case all of the bytes of LSH_REG are selected for storage; therefore, the switch must route all bytes of LSH_REG to subsequent outputs of the switch at the alignment point within a double word. This operation is identical to the operation that must be performed by the switch when executing a normal store operation. Therefore, store operations can be executed as a STCM by forcing M(0:3) of FIG. 6 to '1111' binary. Execution of store instructions in this manner allows the hardware for generating permutation switch controls to be shared for store operations and mask operations which results in a hardware savings. For this reason, store operations are executed as STCM operations leading to the requirement that the mask be '1111' binary for store operations. The generation of the M(0:3) used by the logic of FIG. 6 to FIG. 11 is shown in FIG. 13. Selection of the appropriate mask is controlled by microcode via the SH_OP(0:3) field of the microword. The decode of this field indicates whether M(0:3) is to be generated from the latched mask of the ESA/370 instruction, MMASK(0:3), or from a constant field within the microinstruction, K4(0:3). The current hardware has been designed assuming that MMASK(0:3) is loaded with '1111' binary when a mask instruction is not being executed; therefore, MMASK(0:3) is selected by the logic of FIG. 13 for all encodings of SH_OP(0:3) that do not lie between the values of '1100' and '1111' binary.

Now consider an example STCM in which the 'gathering' function of the permutation switch must be executed. For this example, assume that the rotation amount required for a STCM is three and that the mask is '0101' binary. For this example, the decode of the rotation amount activates the signal BY_ROT_3 indicating the rotation amount of three. In FIG. 7 to FIG. 11, BY_ROT_3 is first expanded by the mask adjustment block (MASK_ADJ in FIG. 16) activating the signals LSH0TOBY3, LSH1TOBY4, LSH2TOBY5, LSH3TOBY6, RSH1TOBY0, RSH2TOBY1, and RSH3TOBY2. Generation of the signal RSH0TOBY7 is not required as this path does not require independent control for any mask operation. Decode of M(0:3) which is set to '0101' binary from MMASK(0:3) indicates that only LSH1 and LSH3 are to be stored. Therefore, the paths from LSH0 to BY3 and LSH1 to BY4 must be disabled. This is accomplished by suppressing the signals LSH0TOBY3 in FIG. 7 and LSH1TOBY4 in FIG. 8. Instead, the paths routing LSH1 to BY3 and LSH3 to BY4 must be enabled. This is accomplished by activating the signals LSH1TOBY3 in FIG. 8 and LSH3TOBY4 in FIG. 10. Because the cache will only store two bytes (store data length is 2), the paths LSH2 to BY5 and LSH3 to BY6 as well as all of paths from RSH_REG to the outputs BY7 to BY2 can be either disabled or allowed to remain enabled for the current example. It will be found in the following section in which mask operations for CLM are considered, however, that LSH2TOBY5 and LSH3TOBY6 should be suppressed. From these considerations along with those for other masks, it is apparent that controls routing the bytes of LSH_REG to DBUSO must be generated independently which requires the mask adjustment block to explicitly assert individual signals for controlling the routing of bytes of LSH_REG to DBUSO.

CLM Operations

A CLM operation consists of a GPR access, a storage fetch, and a subsequent compare of bytes selected from the GPR under control of a mask with the bytes fetched from storage. The selected bytes of the GPR and the bytes from storage are to be compared byte by byte from left to right. The switch's role in executing this instruction consists of selecting the bytes from the GPR and aligning them with the bytes from storage in preparation for executing the compare. To understand the operation, refer to FIG. 1. The contents of the GPR are read from GPRARY into LSH_REG and are to be output on SHO(0:31) for bypass to EU where the comparison is performed. To execute this instruction, the switch must align the data at output BY0 and 'gather' bytes from the GPR under control of the mask as was done for the STCM instruction. The output of the switch is then passed through BIT_SHIFT unmodified. As a result, the selected bytes of the GPR are output left aligned in SHO(0:31). As the data in LSH is being 'gathered' to SHO(0:31), a number of bytes equal to the number of ones in the mask is being fetched from storage left aligned on DBUSIN(0:31) and appended with zero's. Both SHO(0:31) and the storage operand are then bypassed to EU for the comparison. Because the storage data is left aligned and appended with zero's, the bit positions within SHO(0:31) with no corresponding data from the GPR must be zeroed to allow EU to produce a valid comparison by executing a standard 32 bit compare. It is for this reason that the signals LSH2TOBY5 and LSH3TOBY6 are suppressed for the STCM example. It is for this reason also that output byte positions BY0, BY1, BY2, and BY3 from the switch must be forced to zero when all of the controls routing inputs to that particular byte position have been suppressed. The latter requirement, easily obtained when using multiplexers to implement the switch, requires special considerations when implementing the switch with pass devices.

From the above discussion, it is apparent that the execution of CLM is identical to that of STCM with the data aligned at BY0. For the data to be aligned at BY0, ROT_AMT must be forced to zero when CLM is executed. Forcing ROT_AMT to zero is accomplished by the CLM signal of FIG. 4. The CLM signal is generated by decode of the SHOP field of the microinstruction. For the execution of CLM, this field contains the encoding '1000' binary. The decode of SH_OP of '1000' binary results in the signal CLM being activated to a logic one which results in the deselection of both sources of ROT_AMT. As a result, ROT_AMT is forced to '000' binary as required for the execution of CLM. The mask operations are identical with those for STCM.

ICM Operations

As for CLM, an ICM operation contains a GPR access as well as a storage fetch. In this case, however, the data from the storage operand is selectively merged with the data from the GPR under control of a mask. The four bits of the mask correspond with byte positions within the GPR and specify which positions of the GPR are to be replaced with a byte from the storage operand. A mask bit of one indicates that the corresponding byte should be replaced with a byte from storage; a zero indicates that the byte from the GPR should be used.

Referring to FIG. 1, to perform this operation a GPR is read into LSH_REG as a storage operand is fetched, right aligned on DBUSIN(32:63), into RSH_REG. Thus, the valid bytes of data from the storage access are right justified in RSH_REG. The valid bytes of storage data in RSH_REG are spread to byte positions zero to three of the switch as specified by the one's in the four bit mask field. The bytes of LSH_REG corresponding to zero's in the mask field are fed directly through the switch to the remaining byte positions within the outputs zero to three of the switch. These outputs are then passed unmodified through BIT_SHIFT allowing the results of the ICM instruction to be asserted on SHO(0:31). The results are then available for put away to the GPR array and/or for bypass as operands to other functional units.

The above operations can be implemented as follows. First, alignment is forced at BY0 in a similar fashion as for CLM. In this case, however, ICM is set to a logic one by decode of the SHOP field of the microinstruction causing the deselection of both sources to ROT_AMT and setting ROT_AMT to zero. This, along with the mask adjusting hardware, aligns LSH_REG for output on BY0 to BY3 of the switch. The controls routing LSH0 to BY0, LSH1 to BY1, etc., are then suppressed if the corresponding bit in the mask is a one. In their stead, controls spreading the valid bytes from RSH_REG, those corresponding to a one in the mask, to the corresponding byte position are activated.

Figure 11A:
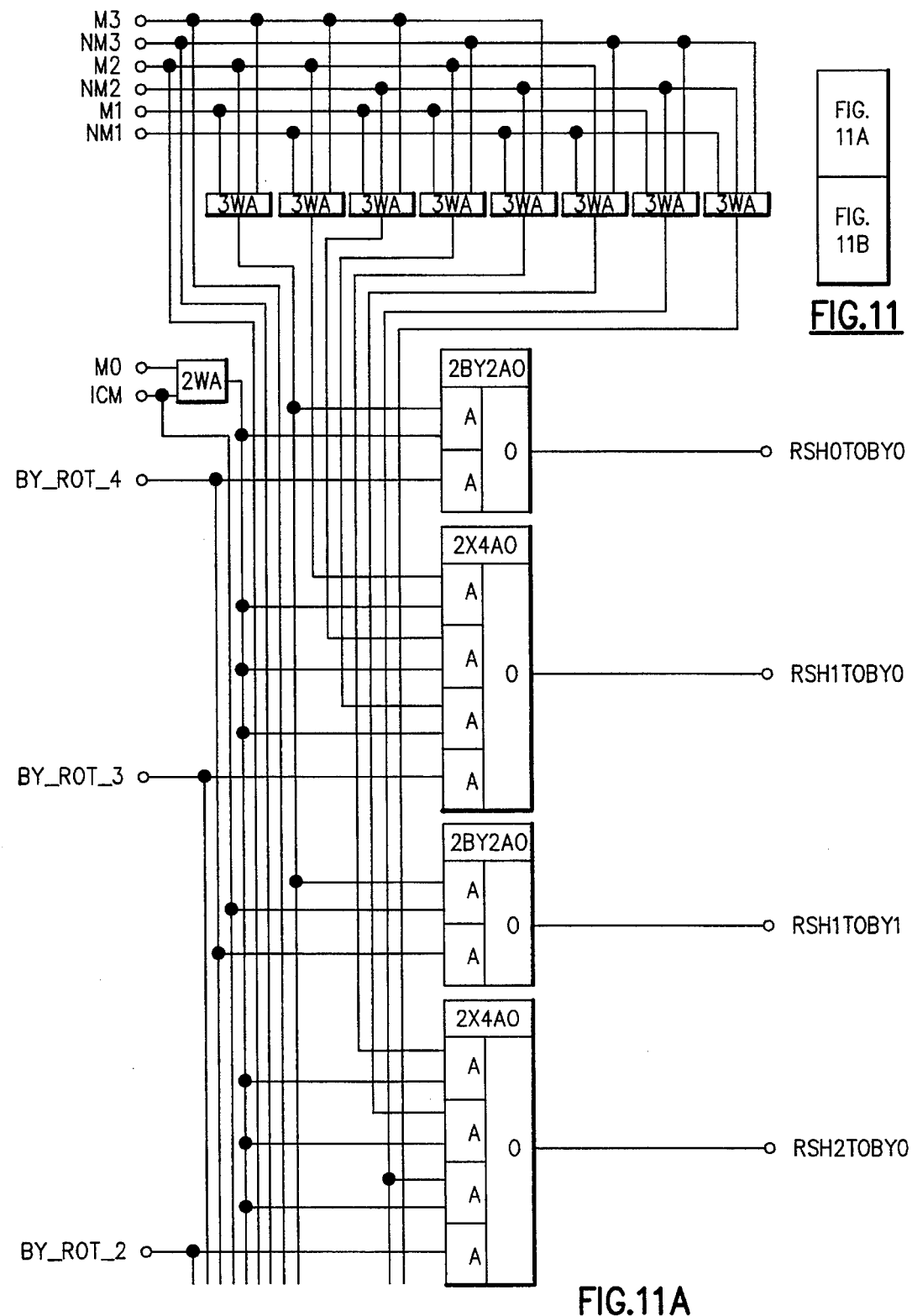
In FIG. 11 (11A and 11B) is shown logic that is used to adjust controls resulting from the storage rotation amount decode to support gathering and spreading operations required for merging data for the CLM, STCM, and ICM ESA/370 instructions.
Figure 11B:
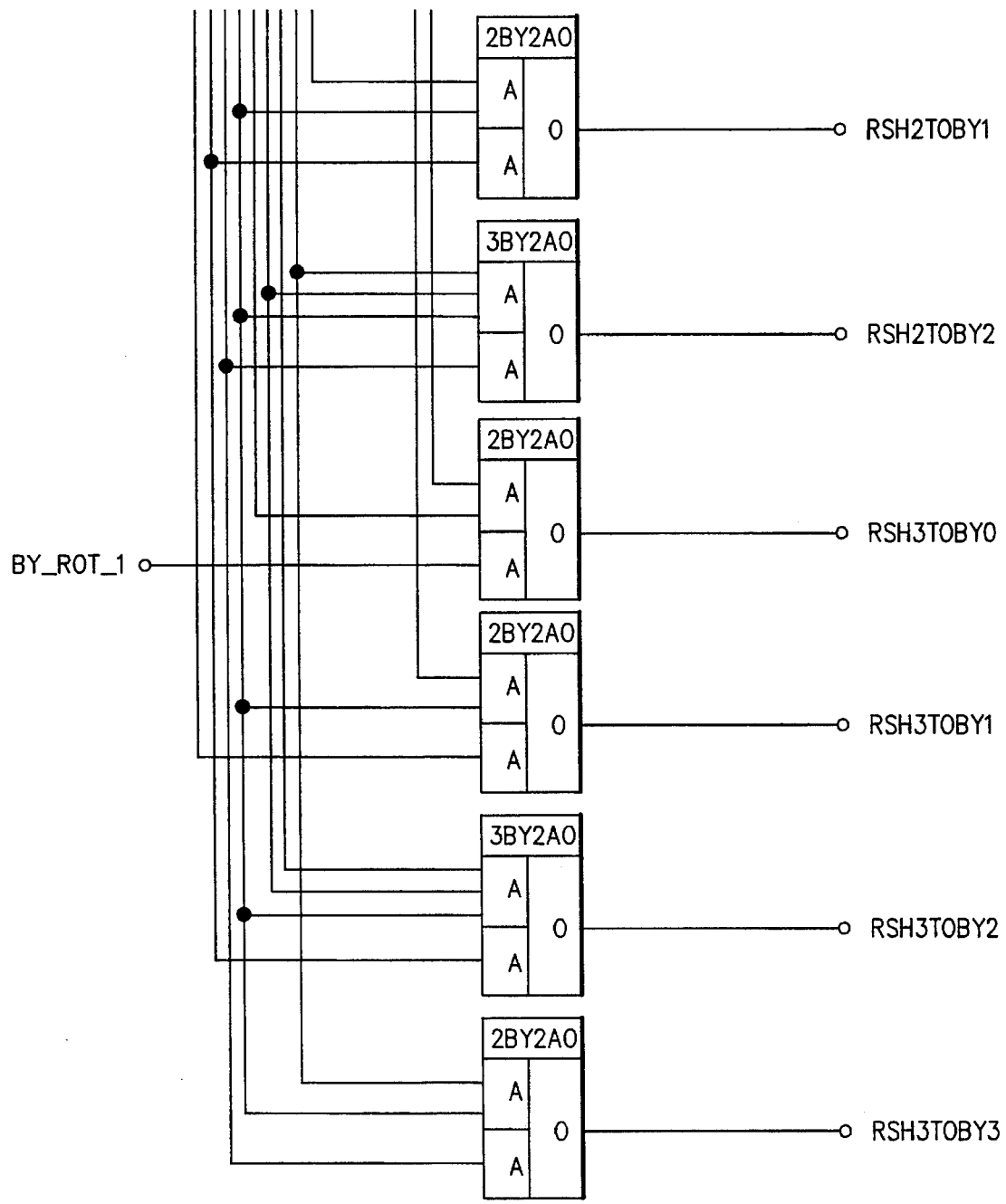
Figure 12:
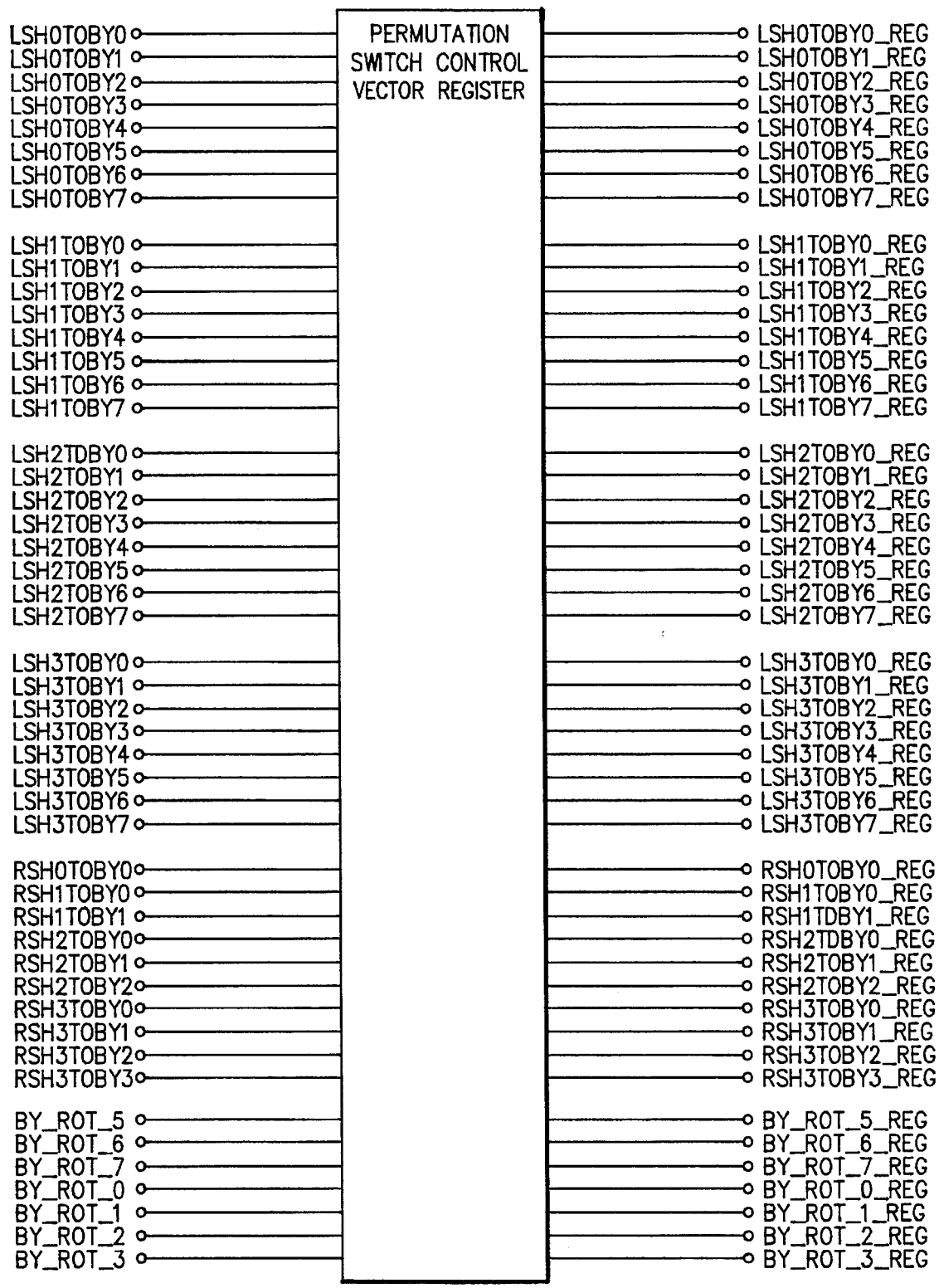
In FIG. 12 is shown the storing of the signals from the logic adjusting the controls from the store rotation amount decode to provide them to the preferred embodiment to control the switching function.

The following concrete example should clarify the above operations. Consider an ICM instruction with a mask of '1010' binary. As a GPR is read into LSH_REG, two bytes are read from storage and stored right aligned in RSH_REG. Setting ROT_AMT to zero activates the controls LSH0TOBY0 in FIG. 7, LSH1TOBY1 in FIG. 8, LSH2TOBY2 in FIG. 9, and LSH3TOBY3 in FIG. 10. However, since the left most bit in the mask is one, the signal LSH0TOBY0 in FIG. 7 must be suppressed. In its stead, a signal routing the left most valid byte in RSH, RSH2, to BY0, RSH2TOBY0 in FIG. 11, is activated. The adjacent bit position in the mask is zero. Therefore, the signal, LSH1TOBY1 in FIG. 8, remains asserted. Similarly, the next bits in the mask are one and zero, respectively, causing the suppression of LSH2TOBY2 in FIG. 9 and activation of RSH3TOBY2 in FIG. 11, and retaining the activation of LSH3TOBY3 in FIG. 10. This suppression and activation of the controls is performed by the logic of FIG. 6 to FIG. 11. As already stated, in FIG. 1 the outputs of the switch are passed unmodified through BIT_SHIFT to SHO(0:31) from which they can be staged in DREGLO or DREGHI before being written to the GPR as well as bypassed to other functional units.

Shift Operations

In ESA/370 shift operations consist of double or single shifts. Referring to FIG. 1, for double shifts, two operands are loaded into the registers LSH_REG and RSH_REG with the most significant bit, MSB, being bit 0 of LSH_REG and RSH_REG considered concatenated to the right of LSH_REG. Single shifts are identical to double shifts except that a four byte operand is loaded into LSH_REG and RSH_REG is zeroed during setup. From the switch point of view, no difference exists between single and double shifts; all shift operations are treated as double shifts. Sign extension and forcing of zero are handled by the bit shifter.

For storage and mask operations, the rotation amount was either forced to zero, or was generated from the three LSB's of the effective address, the storage length, and an indication of the alignment of the operand to be stored. For shift operations, the rotation amount is generated from an address calculation. For shifts, however, the rotation amount generated during the address calculation indicates a bit shift amount rather than an alignment within a double word boundary as for stores. With a 32 bit address calculation, bits 26 to 28 of the address generation are to be used to determine the byte rotation amount for shifts. The rotation amount so generated is fed to the three-to-eight decoder where one of eight signals is asserted indicating the rotation amount. These eight signals are fed to mask adjustment along with a mask of '1111'b. Because the mask is '1111'b, eight of the possible 64 paths from input to output of the switch are enabled in such a manner that the switch operates as a cyclic permutation switch as described in the section "STCM Operations" on page 31. Therefore, the only uniqueness caused by supporting shifts is the addition of hardware to generate byte rotation amounts for shifts from bits 26 to 28 from an address calculation.

Figure 14:
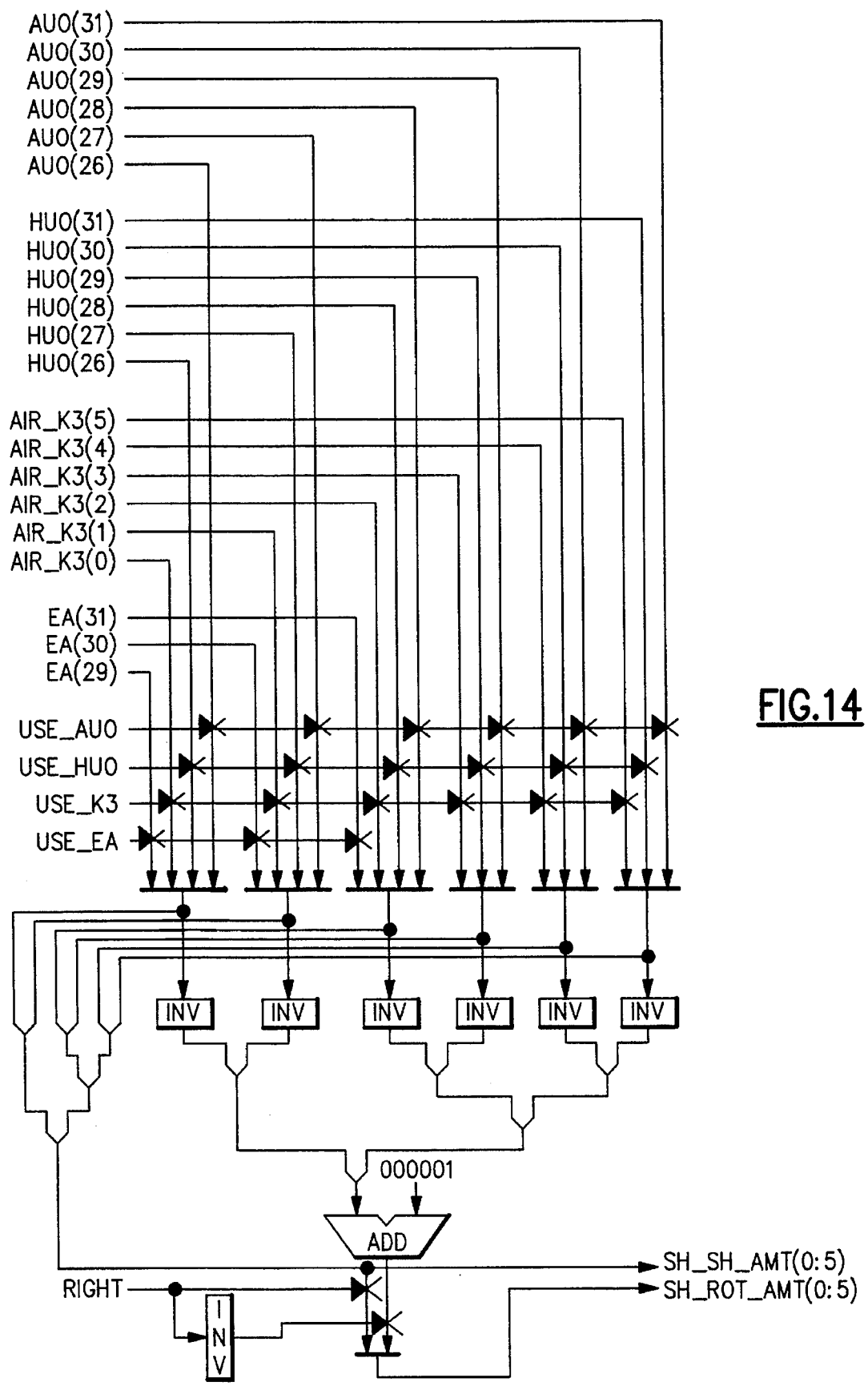
In FIG. 14 is shown logic required to generate the rotation amount that must be executed to perform arithmetic/logical, right/left bit shifting operations.

Logic for generating the shift amount is shown in FIG. 14. The logic consists of a four-to-one multiplexer to choose between one of four possible sources for specifying the shift amount. These sources include the six LSB's of the outputs of AU (AUO(26:31)) and HU (HUO(26:31)), the three LSB's of the effective address bus EA(29:31) concatenated on the right with three zero's, and a constant from the microinstruction (AIR_K3(0:5)). This selection proceeds under the auspices of the microinstruction by decode of the SH_AMT(0:1) field, which produces the gating signals USE_AUO, USE_HUO, USE_K3, and USE_EA. In addition, decode of the SH_OP(0:3) field of the microinstruction is used to generate the gating signal, RIGHT, which is used to convert the gated shift amount, for left shifts, into a right rotation amount for implementing the left shift. The resulting SH_ROT_AMT(0:2) is used to specify the rotation amount to be used by the permutation switch. The ultimate ROT_AMT(0:2) used by the switch is generated by selection between ST_ROT_AMT(0:2) and SH_ROT_AMT(0:2), as shown in FIG. 15. This selection is specified by the encoding of the SH_OP field of the microinstruction, the decoding of which will assert the SHIFT signal for gating SH_ROT_AMT to ROT_AMT for shift operations. The resulting ROT_AMT is then decoded and expanded by mask adjustment as already described.

Summary of the Generation of Switch Controls

A block diagram of the logic for generating the switch controls is shown in FIG. 16. In this figure the sequence of steps for generating the controls can be seen. For storage operations, the three bit storage length is generated in the ST_LEN_GEN block. As indicated above, the store length is generated under control of the STC_LEN(0:2) field of the microword, via selecting between W1(5:7), W2(5:7), and the inverse of AUO(29:31), or by forcing the store length to four unit origin if LEFT_ALIGN is active. If STC_LEN(0:2) is encoded with a value of five, the store length is forced to eight unit origin if W2(0:4) is not zero.

The storage length produced in the ST_LEN_GEN block is fed to the ST_ROT_GEN block which generates the rotation amount required for the store and mask operations. This block, detailed in FIG. 4, consists of two three bit three-to-one adders for implementing the algorithms that were derived in the section "Store Operations" on page 21. LEFT_MOST_IN_LSH specifies the algorithm to be used while CLM and ICM force the rotation amount to zero when either of these two operations are being performed. LEFT_MOST_IN_LSH can be generated by simple decode of the STC_ALIGN(0:1) field of the microword which specifies the alignment of store operands within LSH REG and RSH REG to the shifter.

Figure 5:
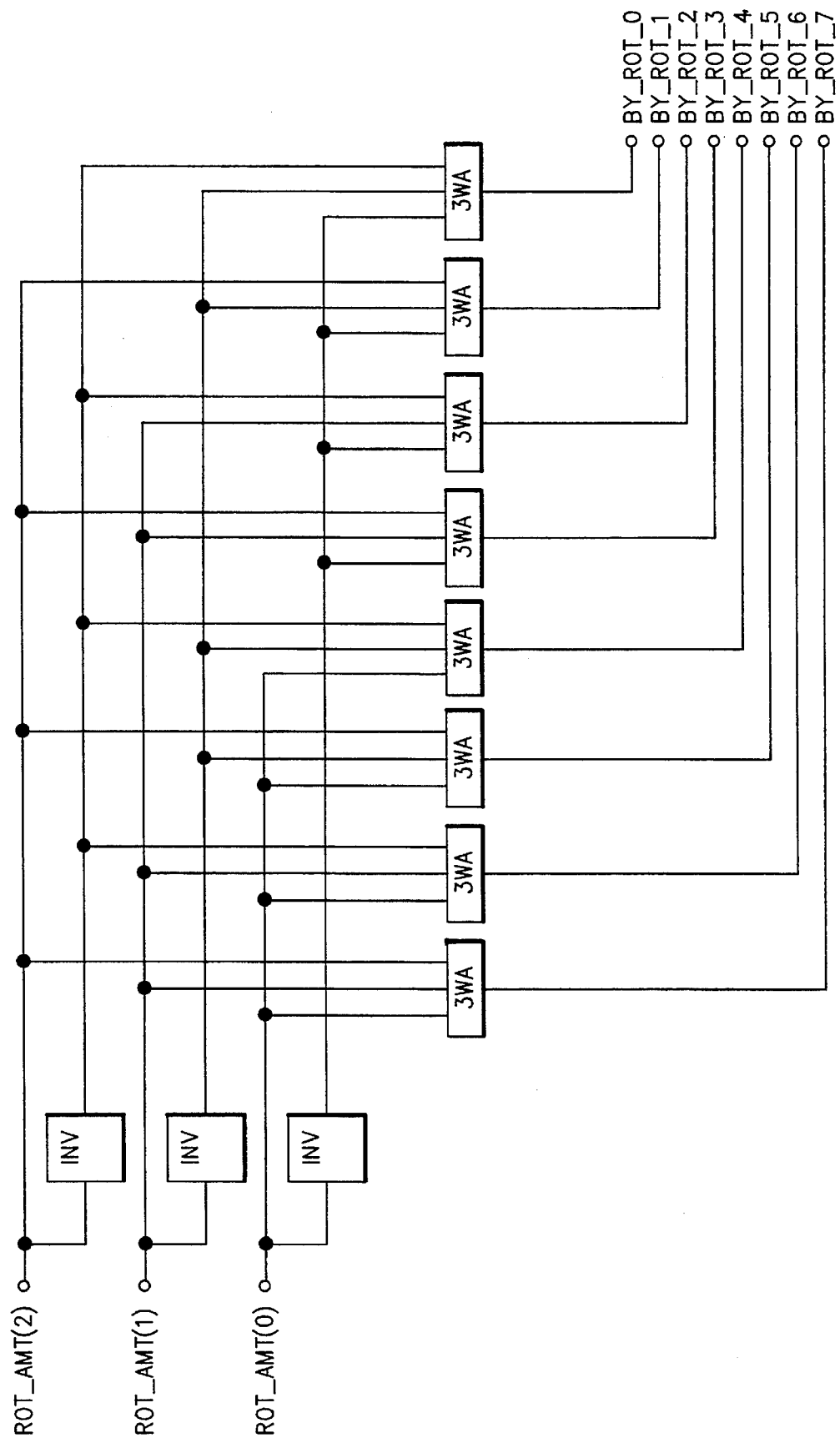
In FIG. 5 is shown the decoding of the storage rotation amount to produce control signals for the preferred embodiment.
Figure 6A:
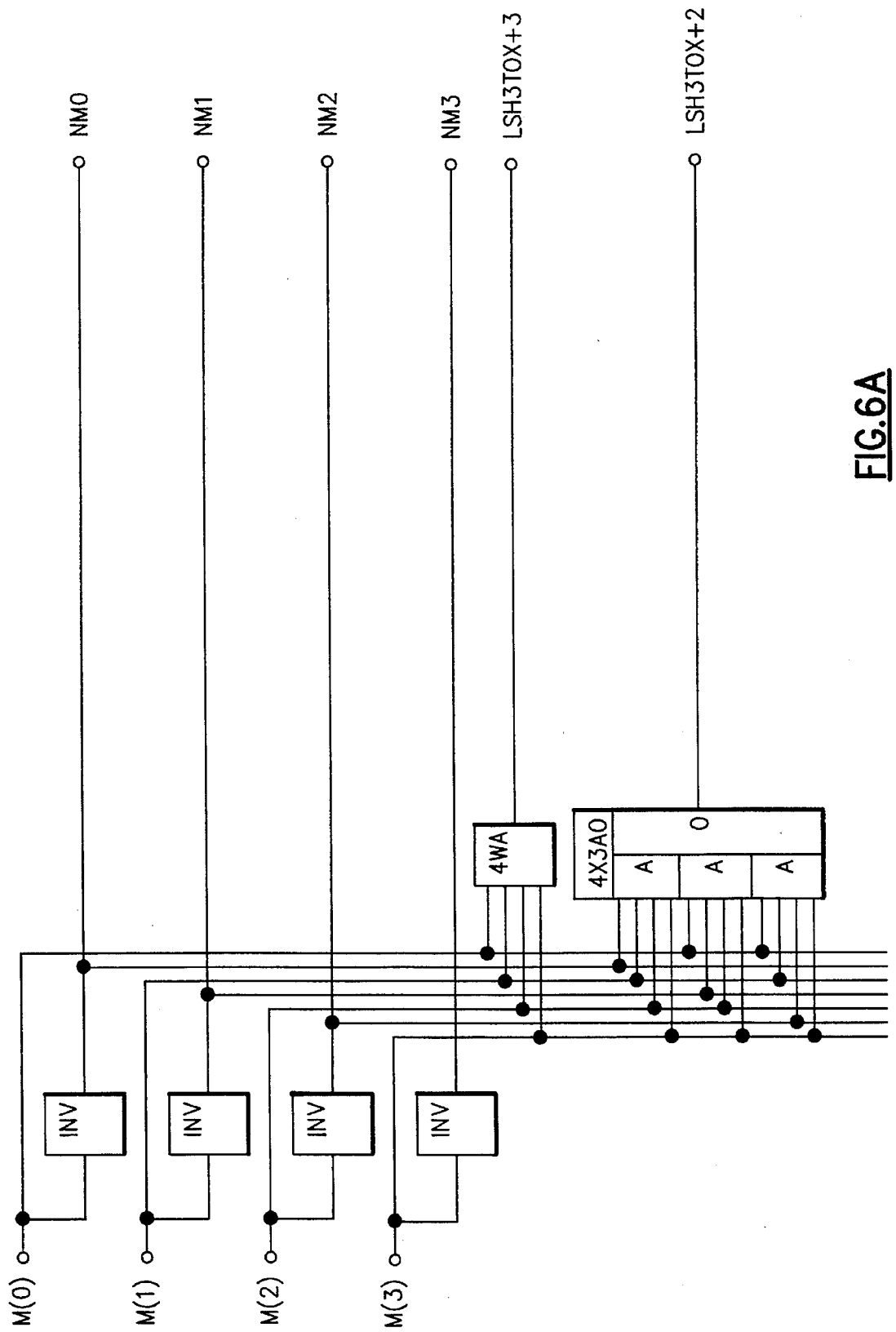
In FIG. 6 (6A and 6B) is shown logic that is used to adjust controls resulting from the storage rotation amount decode to support gathering and spreading operations required for merging data for the CLM, STCM, and ICM ESA/370 instructions.
Figure 6B:
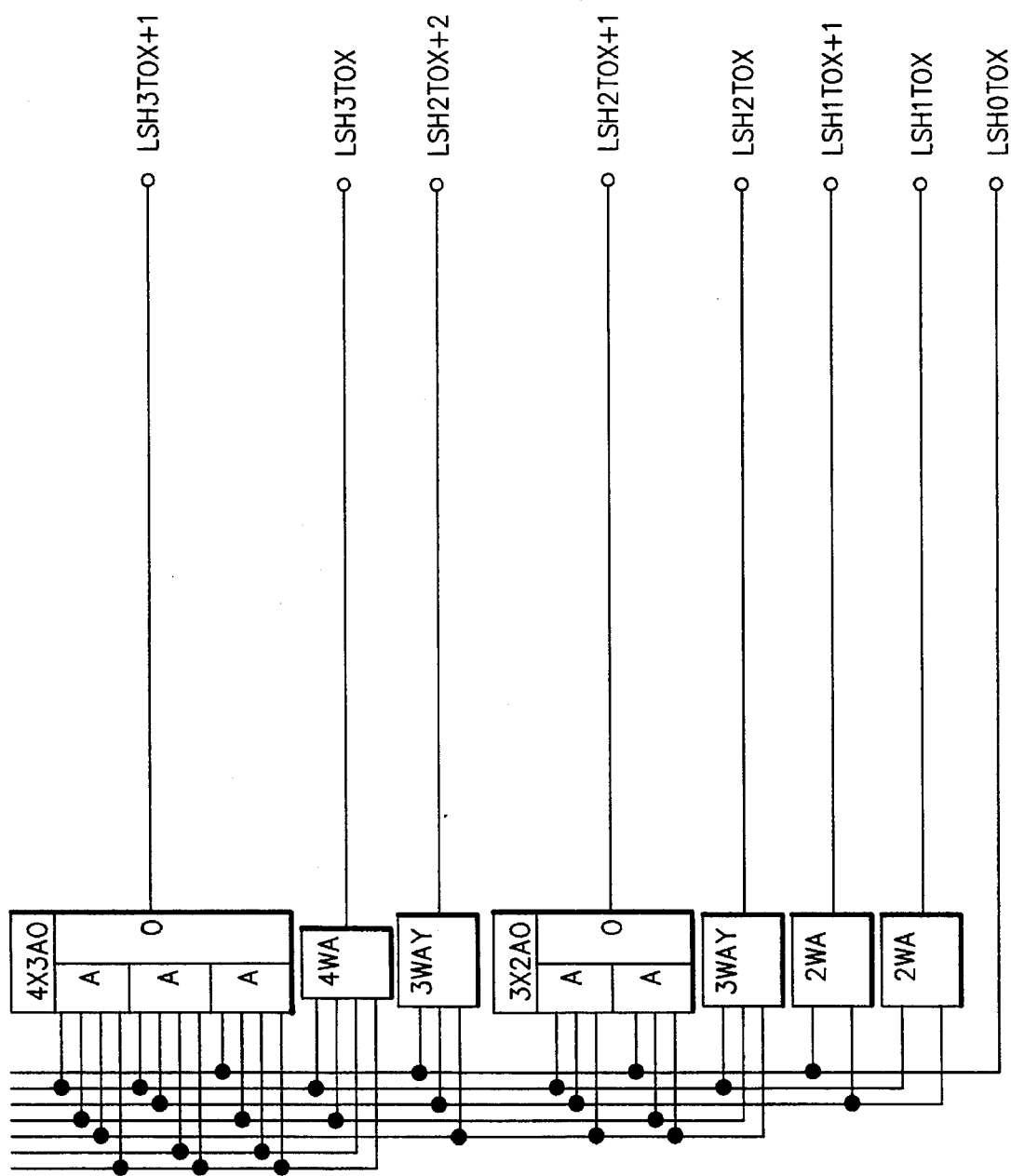
Figure 6:
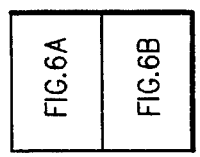
Figure 7:
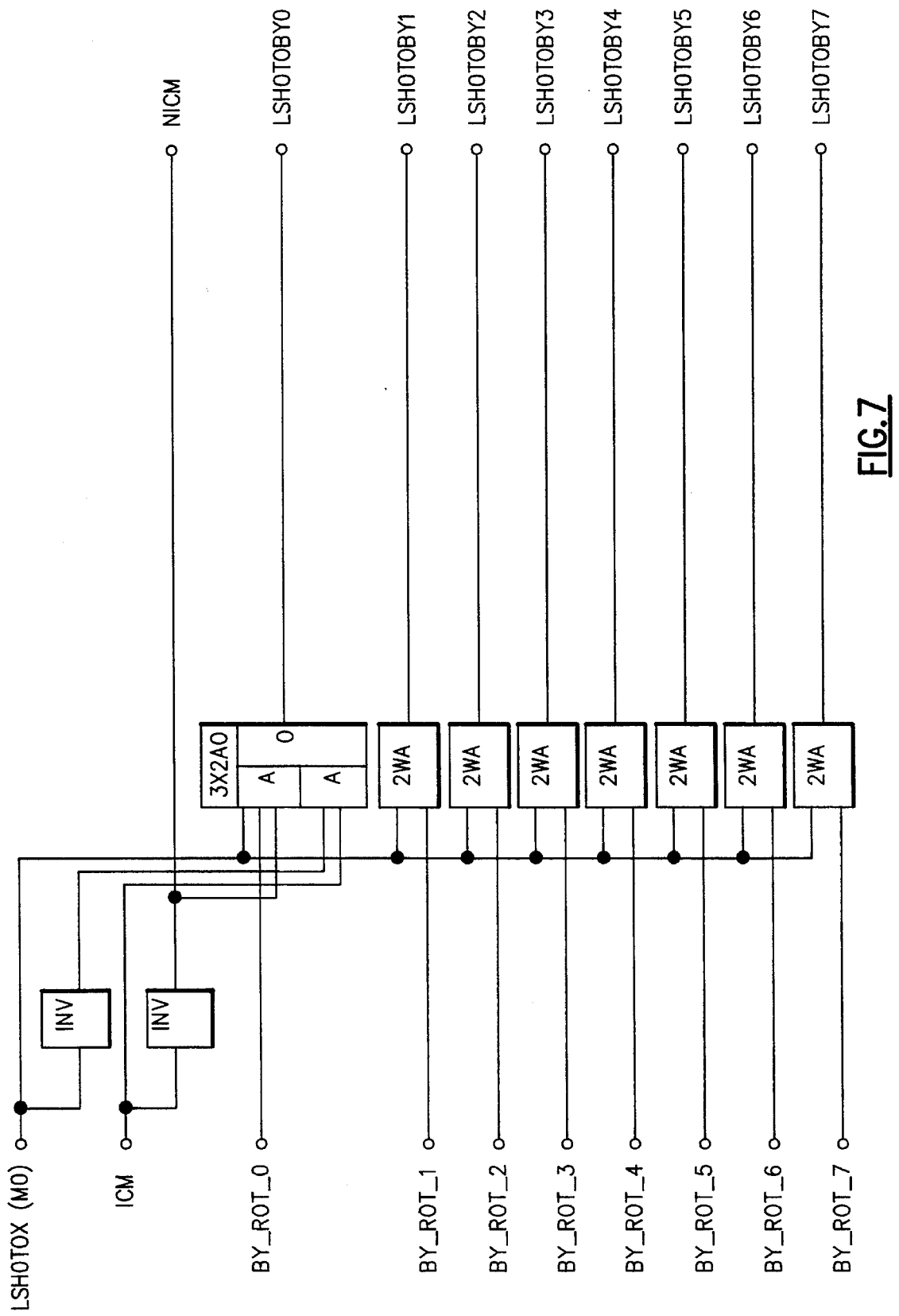
In FIG. 7 is shown logic that is used to adjust controls resulting from the storage rotation amount decode to support gathering and spreading operations required for merging data for the CLM, STCM, and ICM ESA/370 instructions.
Figure 8:
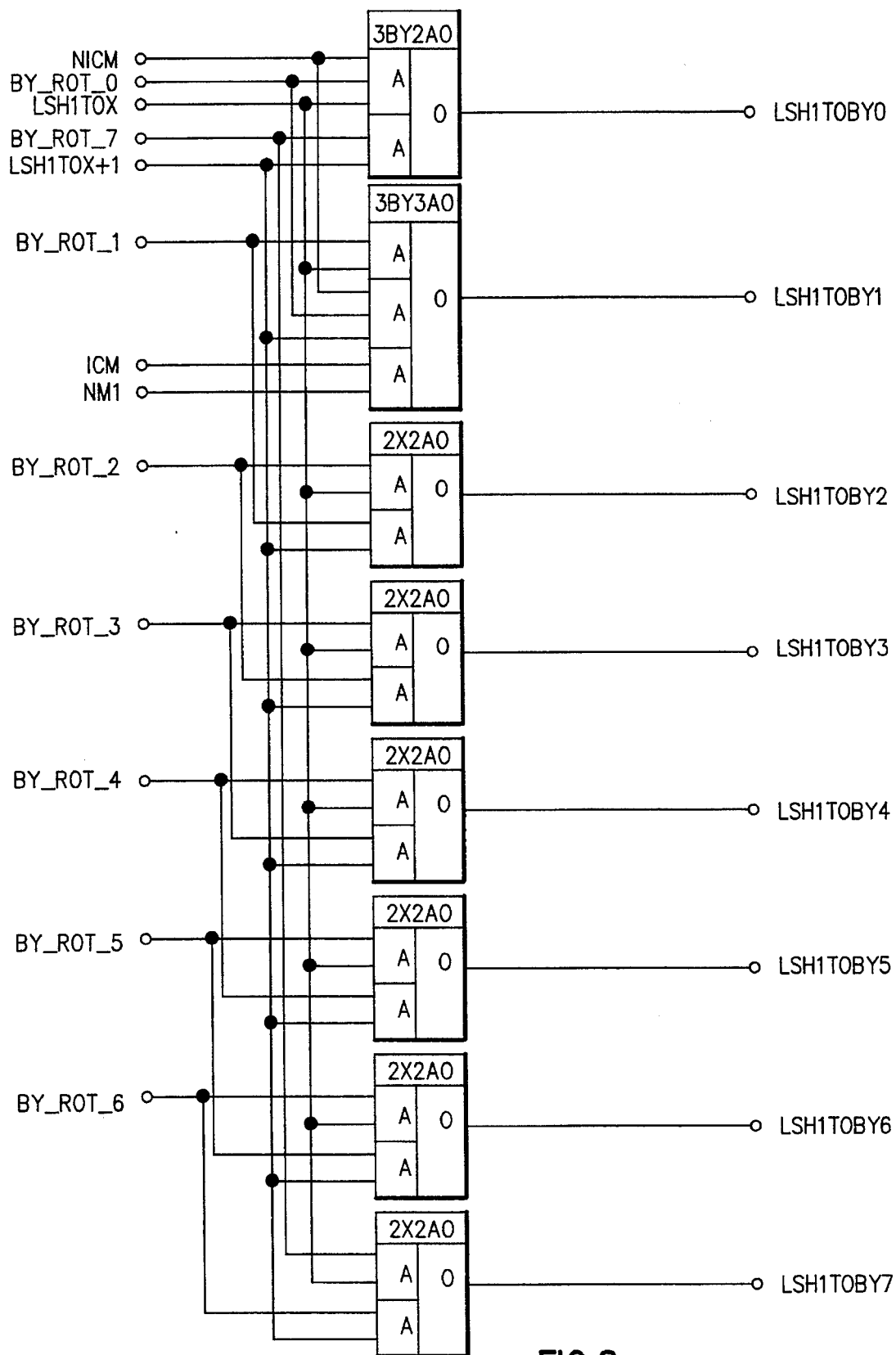
In FIG. 8 is shown logic that is used to adjust controls resulting from the storage rotation amount decode to support gathering and spreading operations required for merging data for the CLM, STCM, and ICM ESA/370 instructions.
Figure 9A:
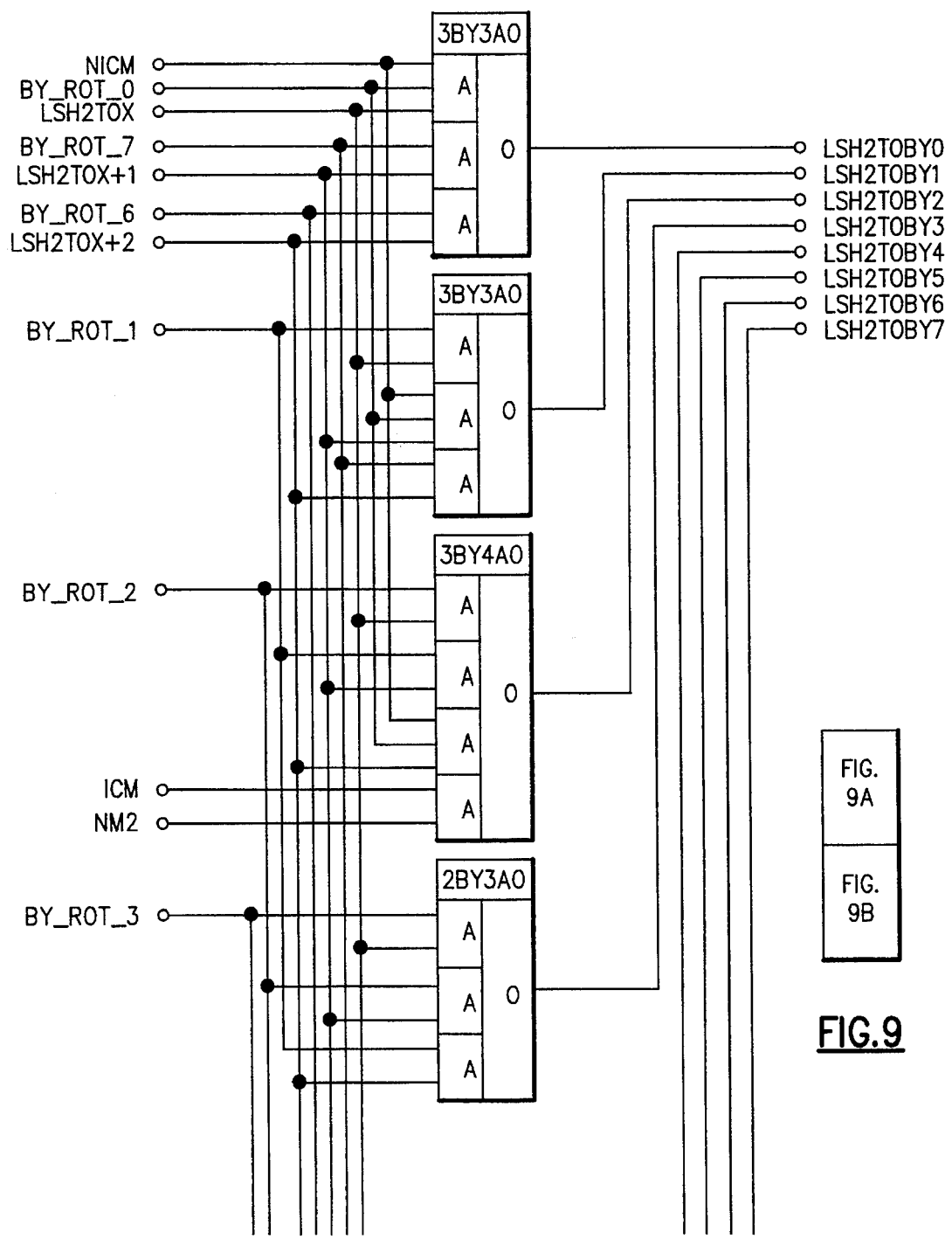
In FIG. 9 (9A and 9B) is shown logic that is used to adjust controls resulting from the storage rotation amount decode to support gathering and spreading operations required for merging data for the CLM, STCM, and ICM ESA/370 instructions.
Figure 9B:
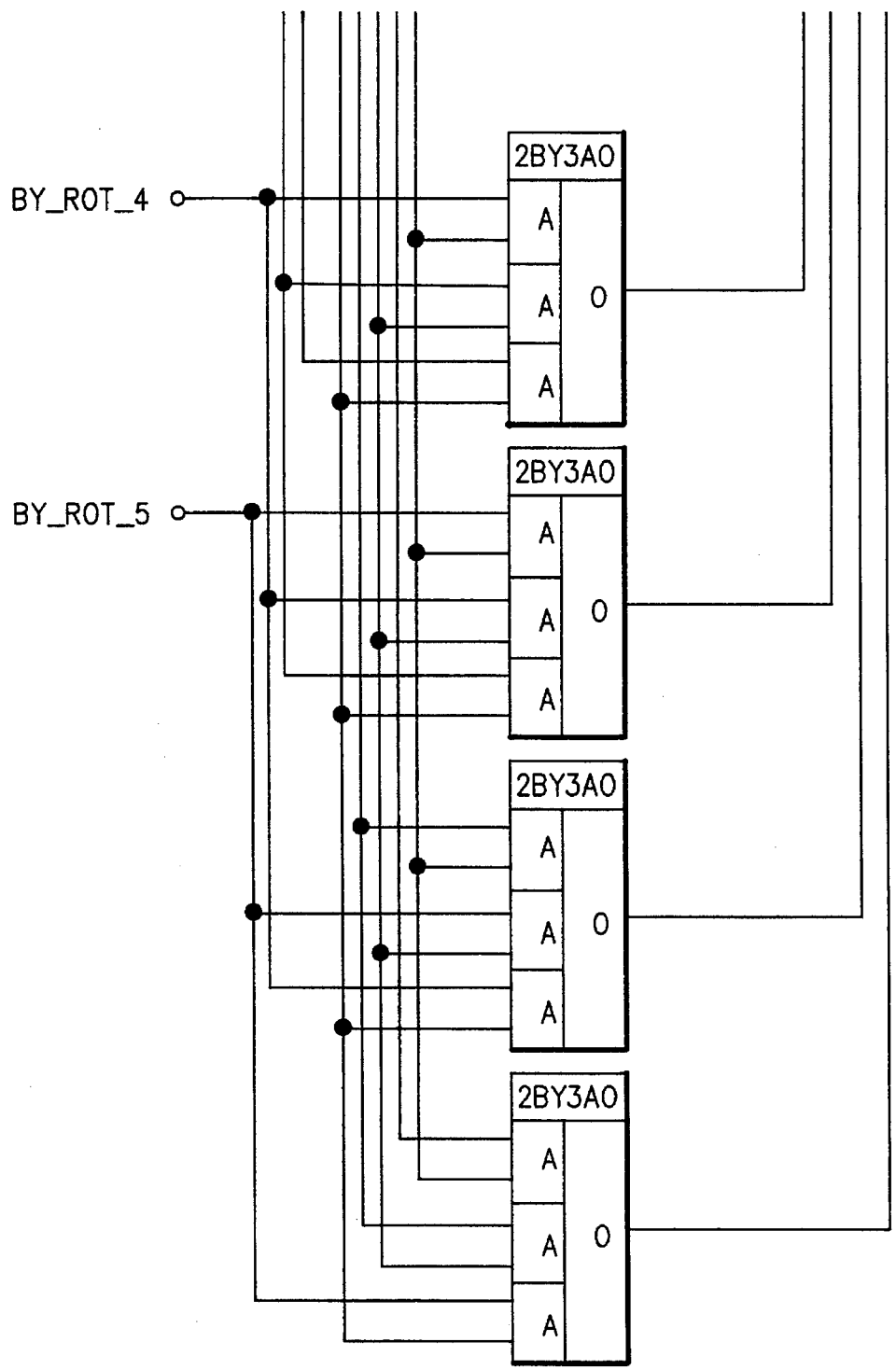
Figures 10, 10A:
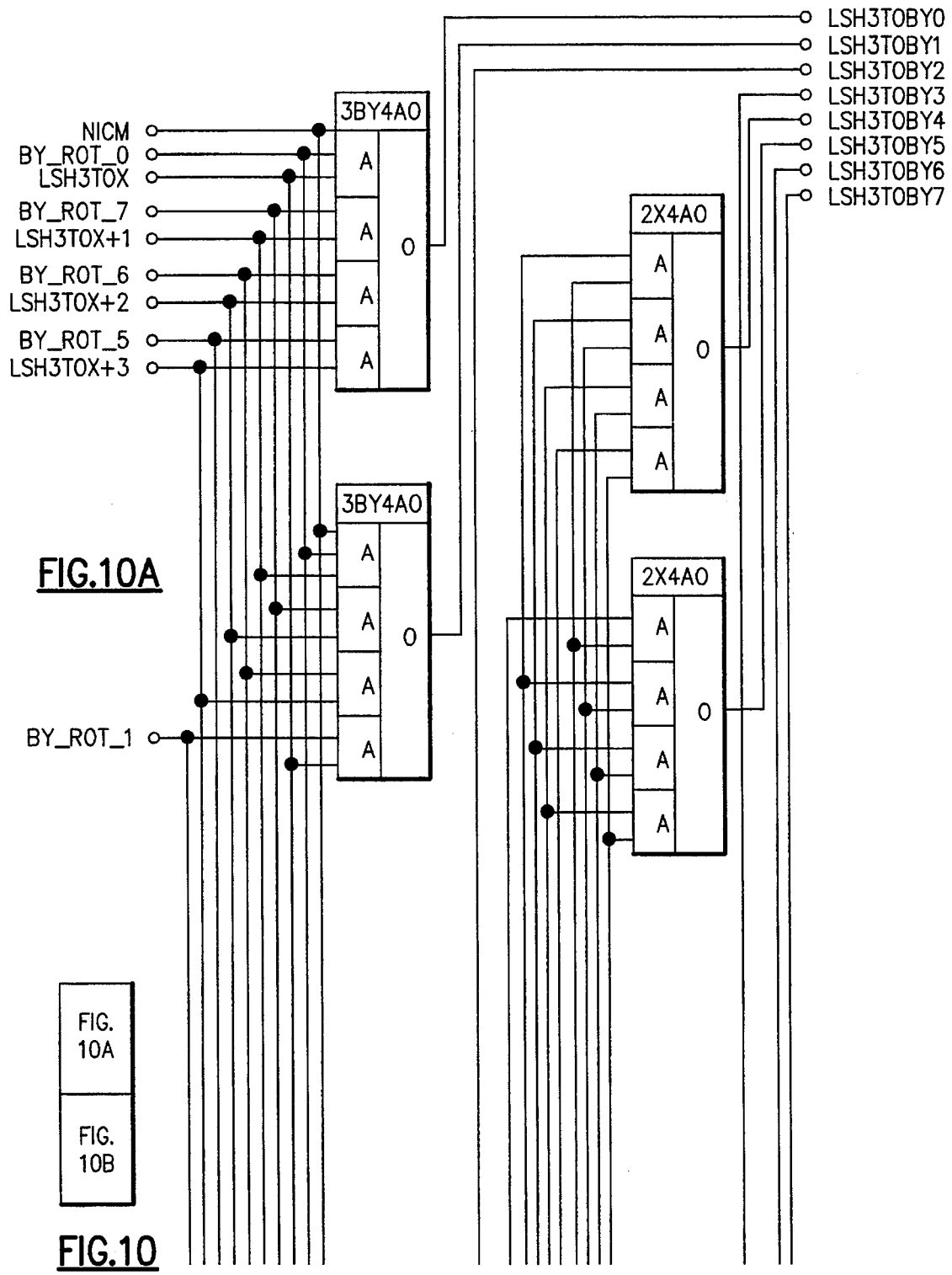
In FIG. 10 (10A and 10B) is shown logic that is used to adjust controls resulting from the storage rotation amount decode to support gathering and spreading operations required for merging data for the CLM, STCM, and ICM ESA/370 instructions.
Figure 10B:
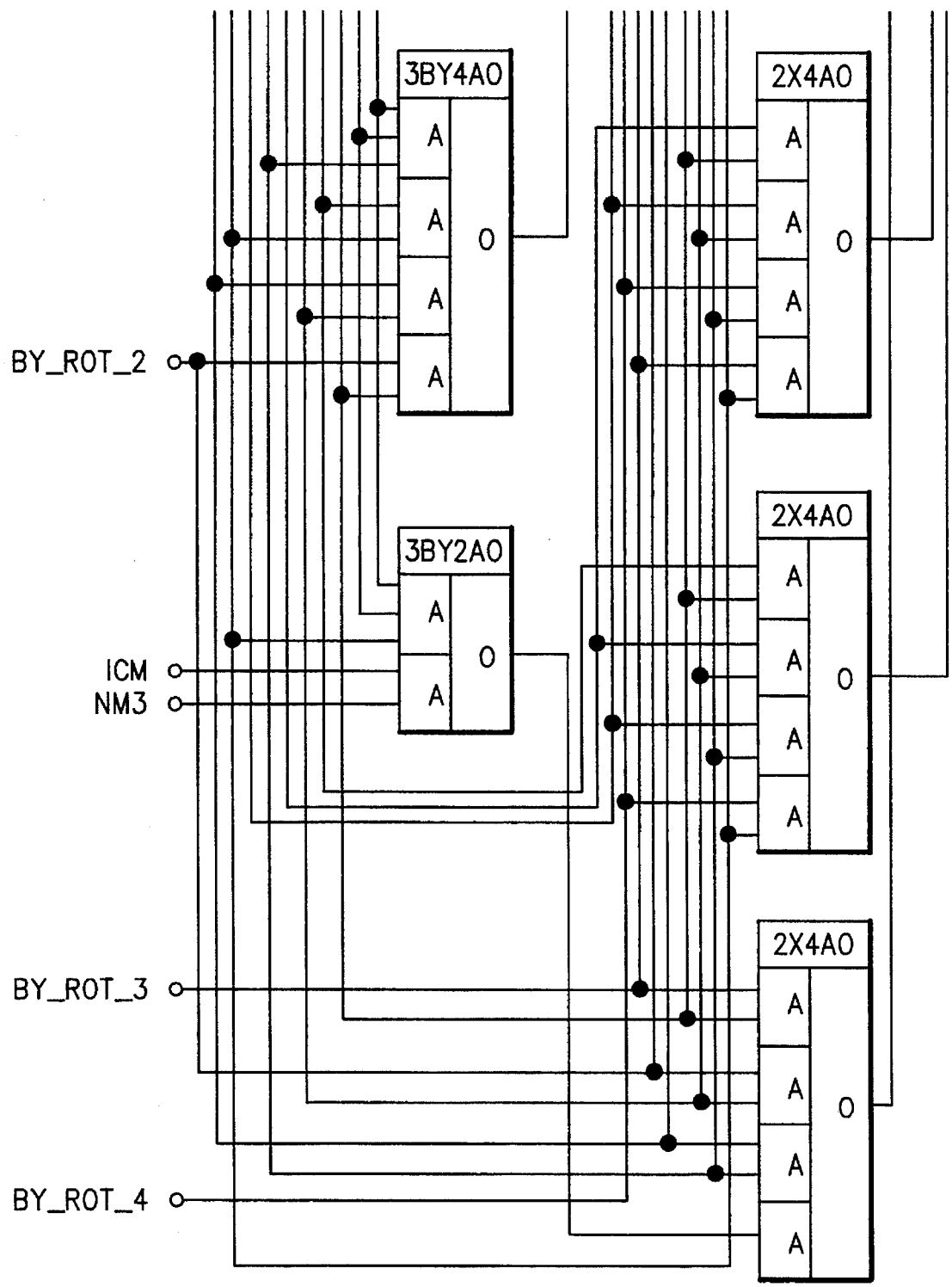

The rotation amount required for shift operations is generated in parallel with that for store operations in the SH_AMT_GEN block. This block selects one of four possible sources listed above for specifying the shift amount. It consists primarily of six four-to-one multiplexers, one for each bit (FIG. 14). The block generates a byte rotate (SH_ROT_AMT(0:2)) and bit shift (SH_ROT_AMT(3:5)) amount. The storage rotation amount (ST_ROT_AMT) and SH_ROT_AMT are then fed to the ROT_AMT_SEL block from which the appropriate rotation amount from the current operation is selected (FIG. 15). ROT_AMT(3:5), in gated from SH_ROT_AMT(3:5), controls the amount of bit shifting and is 0 for all operations other than shifts (SHIFT=0). The selected rotation amount is then decoded in the ROT_AMT_DEC which consists of a three-to-eight decode of the rotation amount (FIG. 5). The eight outputs of the three-to-eight decoder are then fed to the mask adjustment block (MASK_ADJ; expanded in FIG. 6 to FIG. 11) along with the output of the mask selection block in which the four bit mask for performing mask adjustment is selected from MMASK(0:3) or K4(0:3) (FIG. 13). The mask adjustment block then expands the specification of the rotation amount to the actual controls for the switch. These controls are then latched in the permutation switch control vector, FIG. 12, as the switch's operands are latched into LSH_REG and RSH_REG. These latched signals control the switch as shown in FIG. 2. The actual implementation of the bit shifting logic, which is under the control of the bit shift amount as well as the shift type (arithmetic, logical, etc.), is well known in the art and will not be discussed here.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. In a digital computer system executing, as primitive instructions, data processing instructions that require an order of bits in an output data byte to be rotated with respect to an order of bits in an input data byte and instructions that require such rotation in combination with additional manipulation of said input data byte, apparatus for rotating and manipulating an input data byte comprising:

a multifunction permutation switch comprised of an interconnection network connecting n inputs with m outputs with any permutation of the n inputs capable of being connected to the m outputs, said permutation switch having a plurality of input bit lines equal in number to at least a number of bits in a data byte and a plurality of output data lines equal in number to at least said number of bits in said data byte;

means, in response to said data processing instructions, for controlling said multifunction permutation switch in a cyclic mode of operation to connect bits on said input bit lines to said output bit lines so that the sequence of input bits is maintained on said output bit lines when said bits on said input lines are considered as arranged in a circle; and means, in response to said data processing instructions, for controlling said multifunction permutation switch in a non-cyclic mode of operation to connect bits on said input bit lines to said output bit lines to execute gather operations and spread operations.

2. A digital computer system as in claim 1 wherein operands to said multifunction permutation switch are supplied from a plurality of sources including general purpose registers, and storage units whose output is supplied as data to a data cache and to a bit shifter functional element for completing shift operations and rotate operations and passing results from merging operations and wherein operands include input operands supplied to the multifunction permutation switch such that storage operands can be supplied with left most byte of data supplied to the left most byte position of the left half of the switch, the right most byte of data supplied to the right most byte position of the left half of the multifunction permutation switch, and the right most byte of data supplied to the right most byte position of the right half of the multifunction permutation switch.

3. A digital computer system as in claim 2 including means for supplying said multifunction permutation switch with an indication of whether said storage operands have been supplied with left most byte of data supplied to a left most byte position of a left half of the multifunction permutation switch, a right most byte of data supplied to a right most byte position of a left half of the multifunction permutation switch, and the right most byte of data supplied to the right most byte position of the right half of the multifunction permutation switch.

4. A digital computer system as in claim 3 including means to provide an input to said multifunction permutation switch identifying a store or shift operation.

5. A digital computer system as in claim 2 including means for supplying the multipurpose permutation switch with a storage address and a store length for a store operation.

6. A digital computer system as in claim 5 including means for determining the rotation amount to be executed by the multifunction permutation switch by an examination of the storage address, the store length, and the indication of how operands are supplied to the multifunction permutation switch.

7. A digital computer system as in claim 6 including means for determining a rotation amount (ROT_AMT) to be executed by the multifunction permutation switch in which the right most byte of the storage operand is provided to the right most byte of the right half of the permutation switch as:

$$ROT\_AMT = (EA + ST\_LEN + 5) \bmod 8$$

where EA represents the least significant bits of the storage address specifying the byte within an 8-byte boundary, and ST_LEN represents store length.

8. A digital computer system as in claim 7 including means for forcing ST_LEN to '011'b when the storage operand is provided with the left most byte of data supplied to the left most byte of the left half of the permutation switch.

9. A digital computer system as in claim 1 including means for selecting a bit mask from a plurality of sources including microcode constant fields and digital computer system instruction fields to supply masks for controlling merging operations of the multifunction permutation switch.

10. A digital computer system as in claim 1 including a microcode controlled means responsive to operation of the multifunction permutation switch, dataflow of the digital computer system, and control paths to allow microcode to specify the operation performed by the multifunction permutation switch.

11. A digital computer system as in claim 1 including a means for selecting between a shift amount and a store rotation amount to produce a desired rotation amount.

* * * * *